United States Patent
Nagatomi

(10) Patent No.: US 8,446,809 B2
(45) Date of Patent: May 21, 2013

(54) OPTICAL PICKUP DEVICE AND OPTICAL DISC DEVICE

(75) Inventor: Kenji Nagatomi, Kaizu (JP)

(73) Assignee: Sanyo Electric Co., Ltd., Moriguchi-shi, Osaka (JP)

(*) Notice: Subject to any disclaimer, the term of this patent is extended or adjusted under 35 U.S.C. 154(b) by 74 days.

(21) Appl. No.: 12/763,565

(22) Filed: Apr. 20, 2010

(65) Prior Publication Data
US 2010/0265810 A1  Oct. 21, 2010

(30) Foreign Application Priority Data

Apr. 20, 2009 (JP) ................. 2009-102440
Apr. 28, 2009 (JP) ................. 2009-109238

(51) Int. Cl.
*G11B 7/00* (2006.01)

(52) U.S. Cl.
USPC ............. 369/112.01; 369/112.03; 369/44.24

(58) Field of Classification Search
USPC ............. 369/44.23, 44.24, 112.01, 112.02, 369/112.03, 112.1, 112.04, 112.07, 112.15, 369/112.23
See application file for complete search history.

(56) References Cited

U.S. PATENT DOCUMENTS 6,967,908 B2 * 11/2005 Ogasawara et al. ........ 369/44.23

FOREIGN PATENT DOCUMENTS

| JP | 2002-92905 A | 3/2002 |
|---|---|---|
| JP | 2006-252716 A | 9/2006 |
| JP | 2006-260669 A | 9/2006 |
| JP | 2009-3986 A | 1/2009 |

OTHER PUBLICATIONS

First Notice of Opinions on the Examination for corresponding CN Application No. 201010165124.7, Jun. 24, 2011, pp. 1-10.
Notification of Reasons for Refusal issued for JP Application No. 2009-109238, mailed on Nov. 13, 2012.

* cited by examiner

*Primary Examiner* — Nabil Hindi
(74) *Attorney, Agent, or Firm* — Ditthavong Mori & Steiner P.C.

(57) ABSTRACT

An optical pickup device imparts different astigmatisms from each other to light fluxes in four light flux areas A through D formed around an optical axis of laser light, out of the laser light reflected on a disc. The optical pickup device also changes the propagating directions of the light fluxes in the light flux areas A through D to separate the light fluxes in the light flux areas A through D from each other. A signal light area where only signal light exists is defined on a detection surface of a photodetector. Sensing portions are arranged at a position corresponding to the signal light area. Accordingly, only the signal light is received by the sensing portions, thereby suppressing deterioration of a detection signal resulting from stray light.

10 Claims, 17 Drawing Sheets

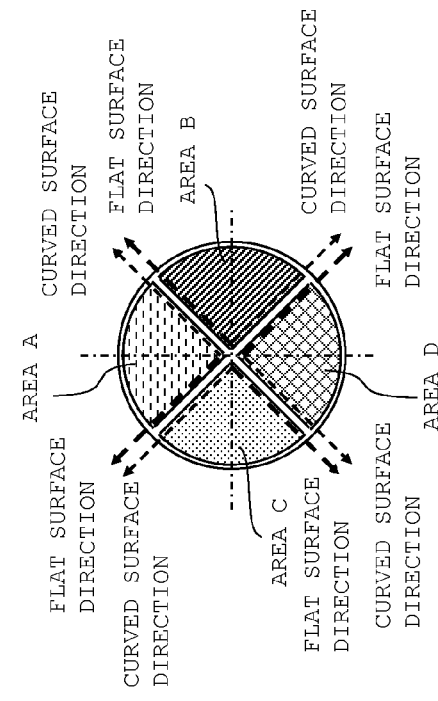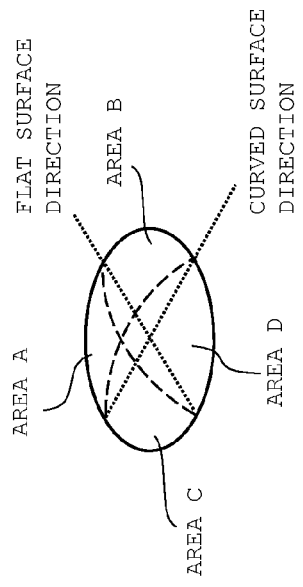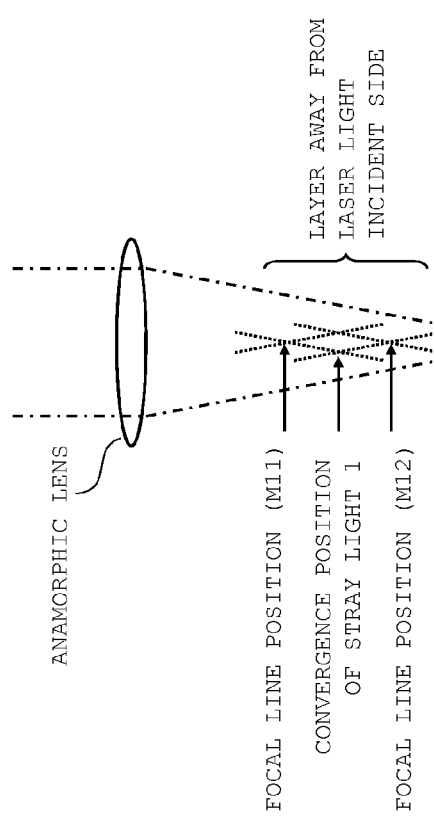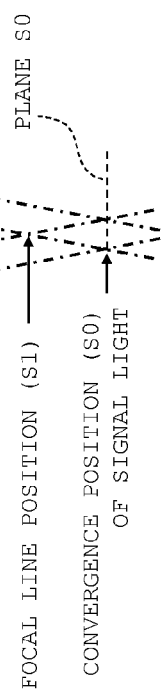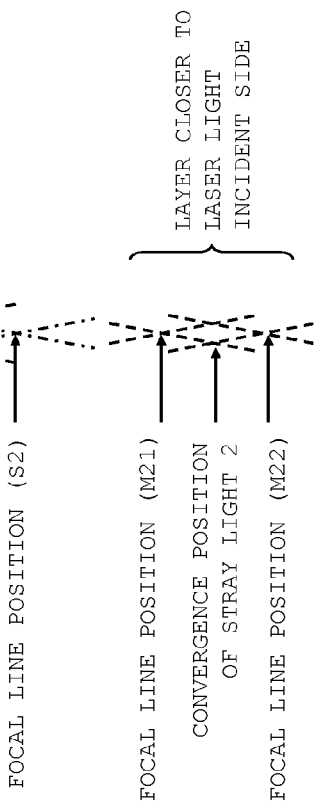

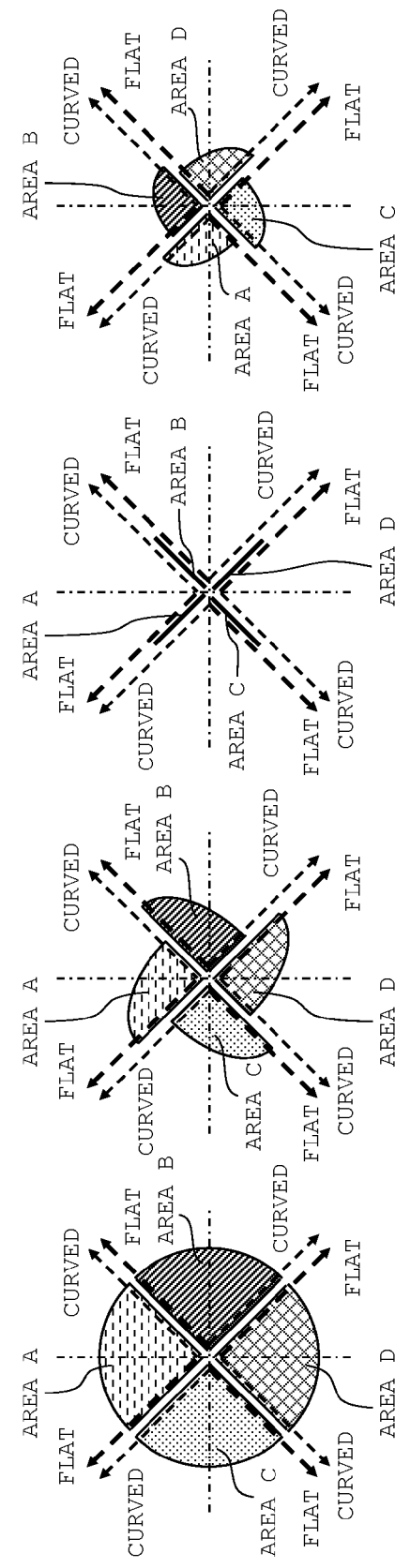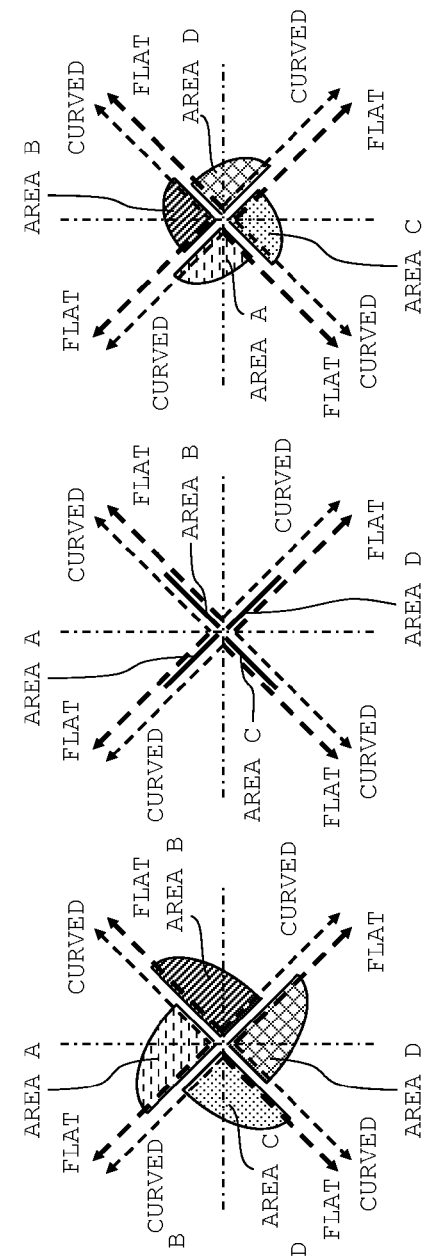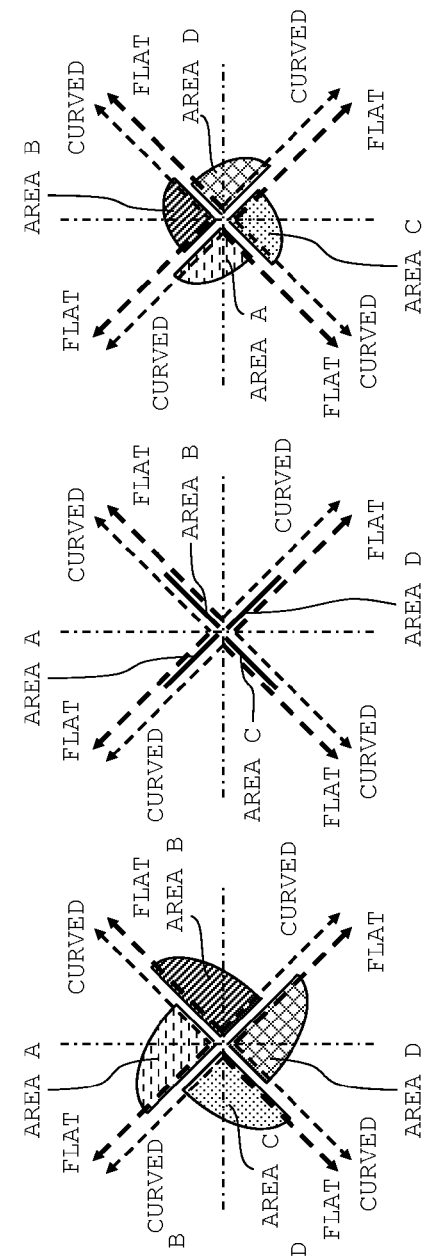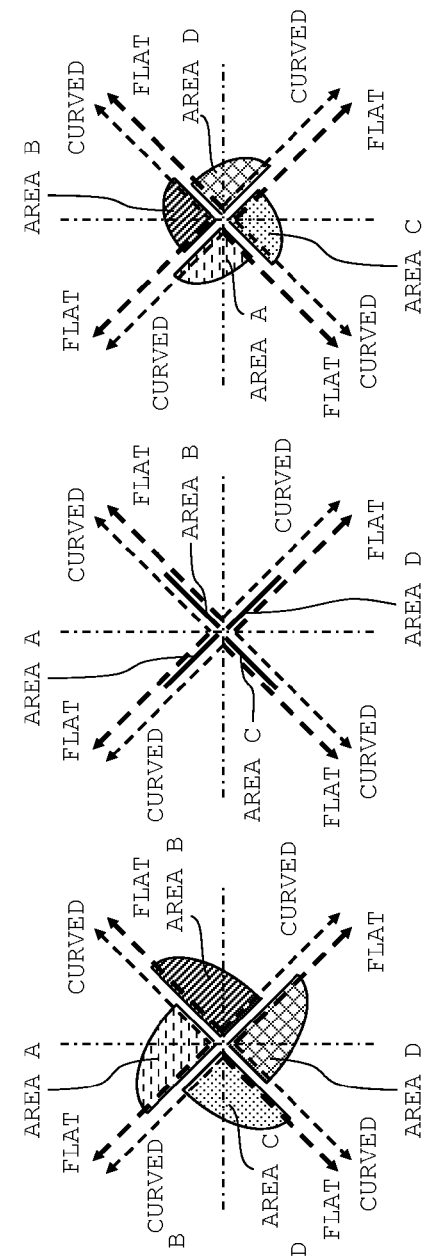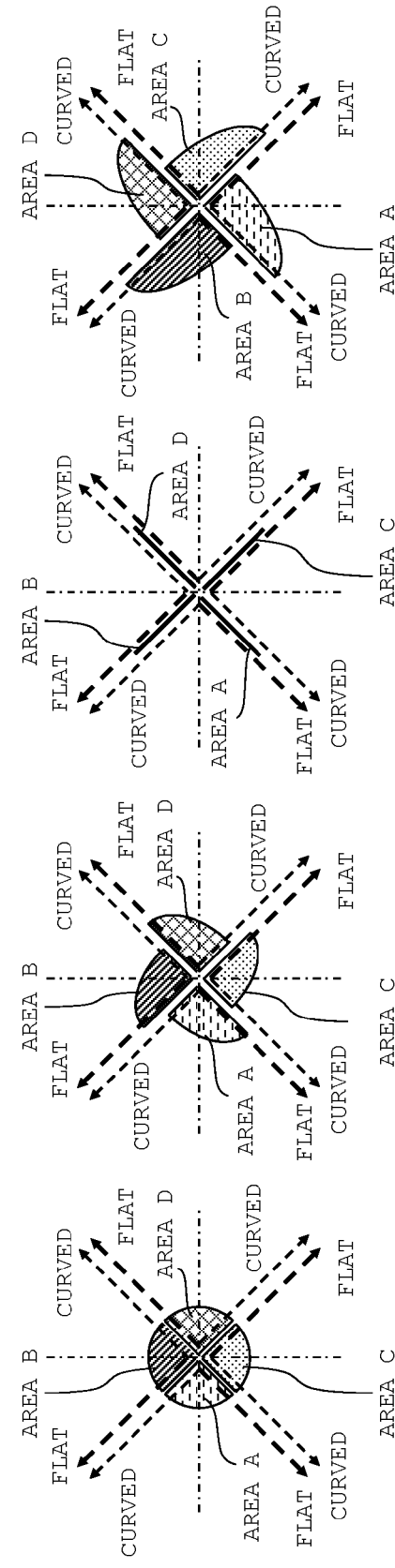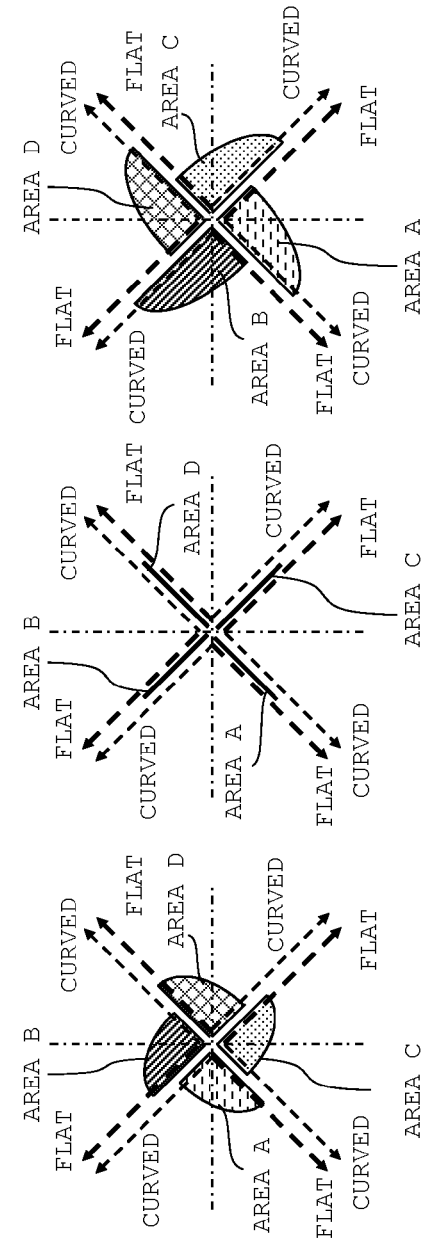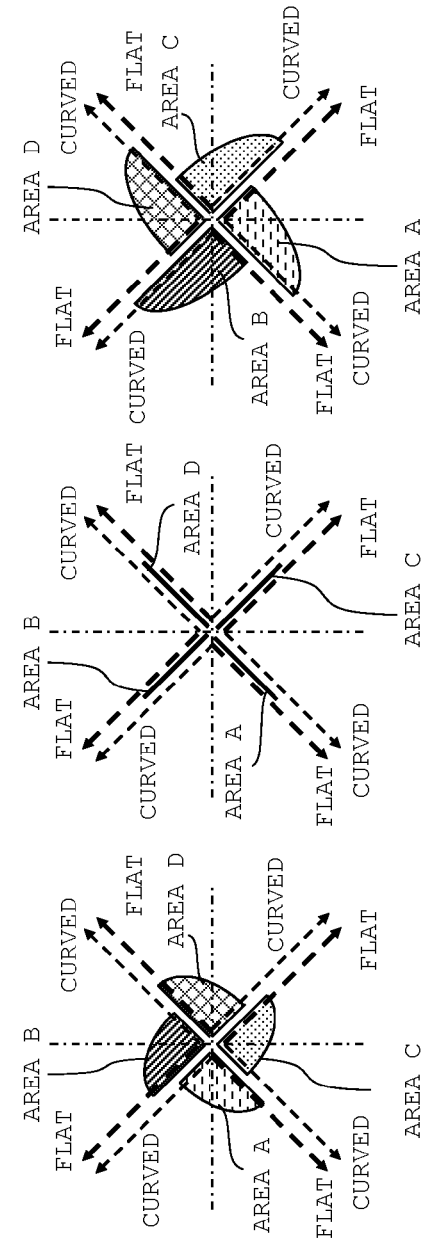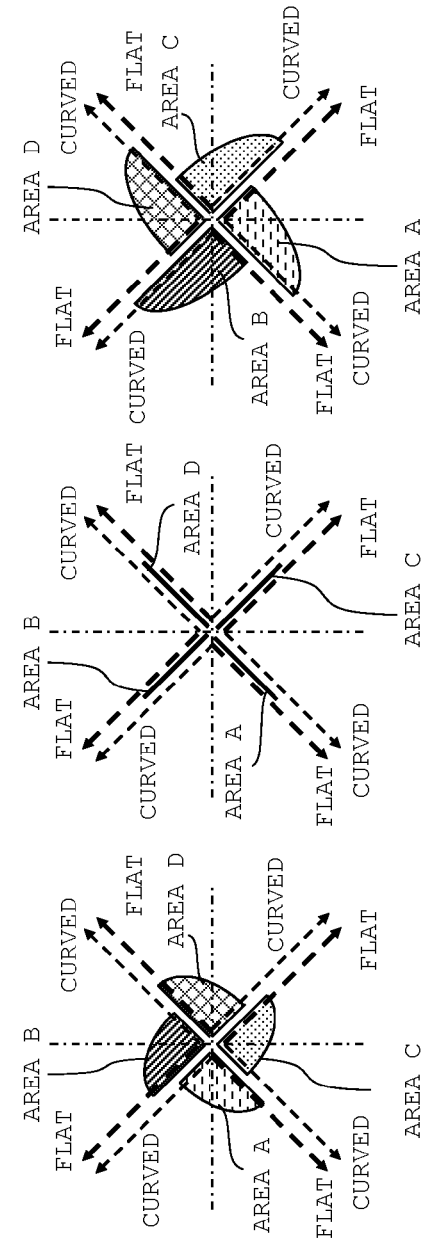

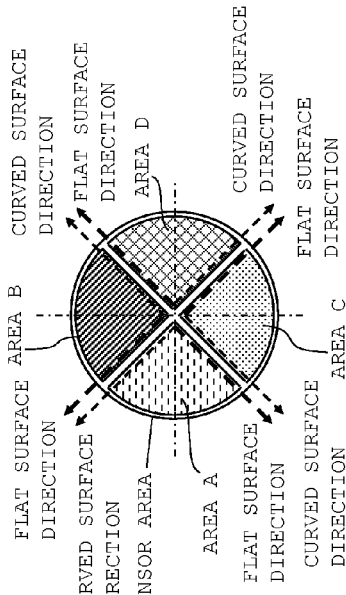
FIG. 3A  LIGHT FLUX DIVIDING PATTERN
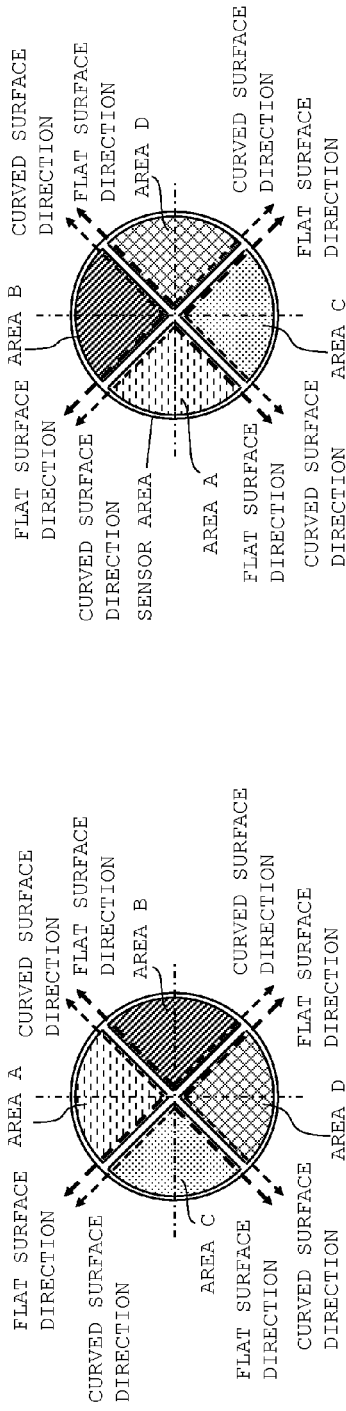
FIG. 3B  SIGNAL LIGHT
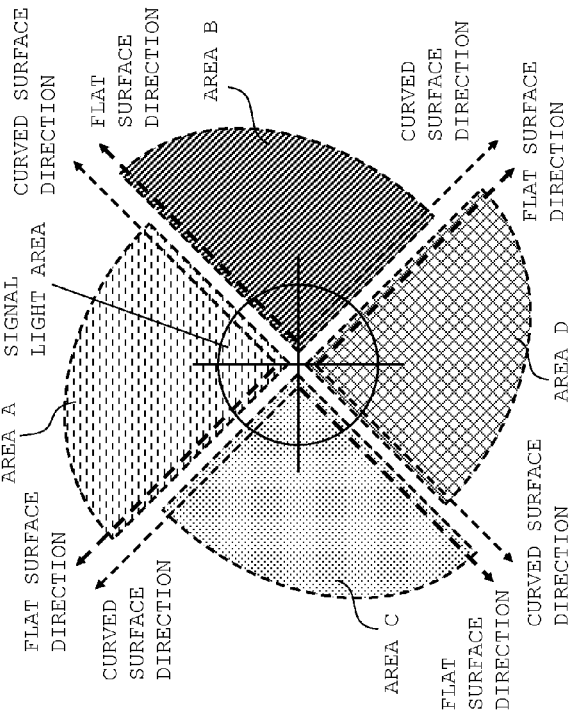
FIG. 3C  STRAY LIGHT 1
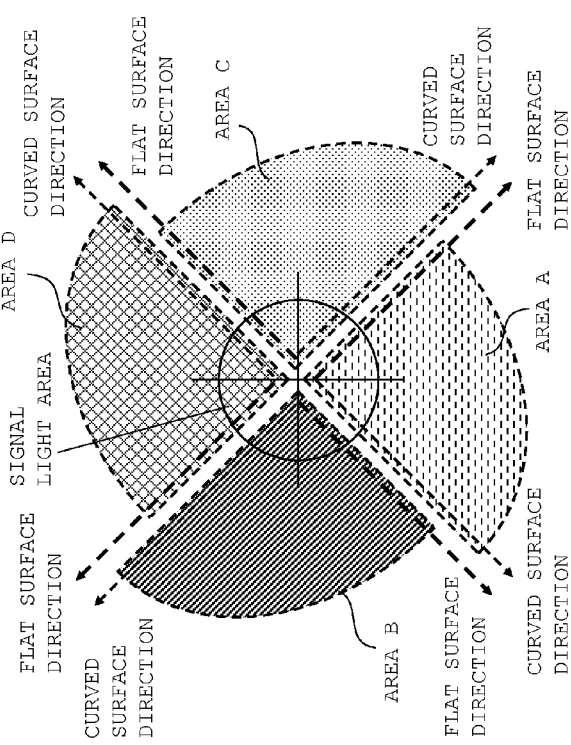
FIG. 3D  STRAY LIGHT 2

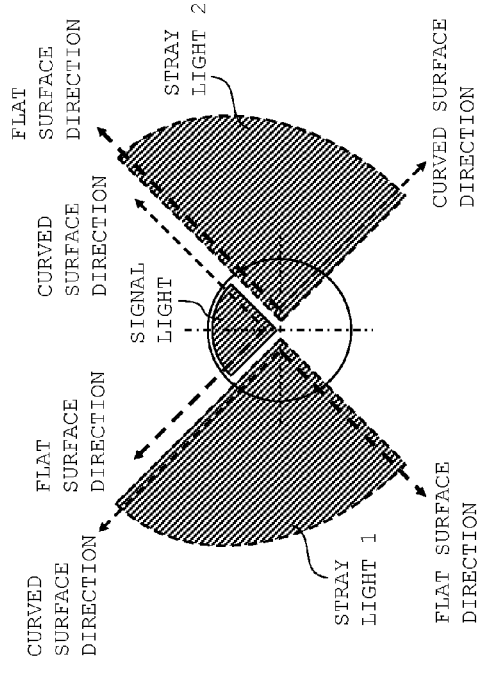
FIG. 4A LIGHT FLUX STATE ON AREA A
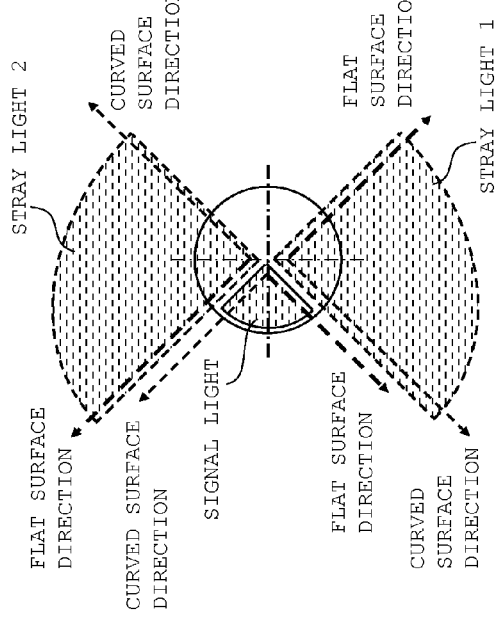
FIG. 4C LIGHT FLUX STATE ON AREA C
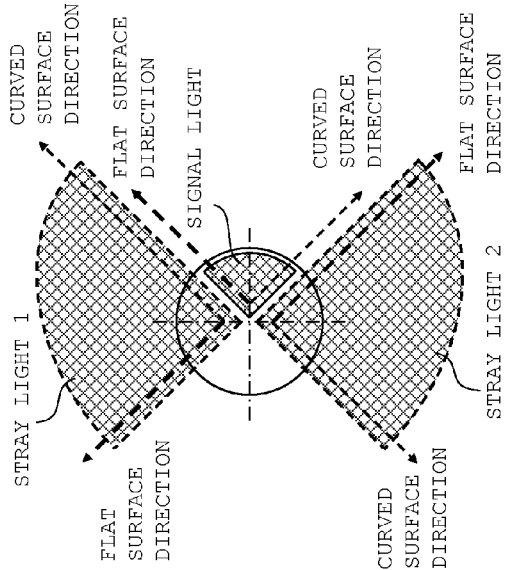
FIG. 4B LIGHT FLUX STATE ON AREA B
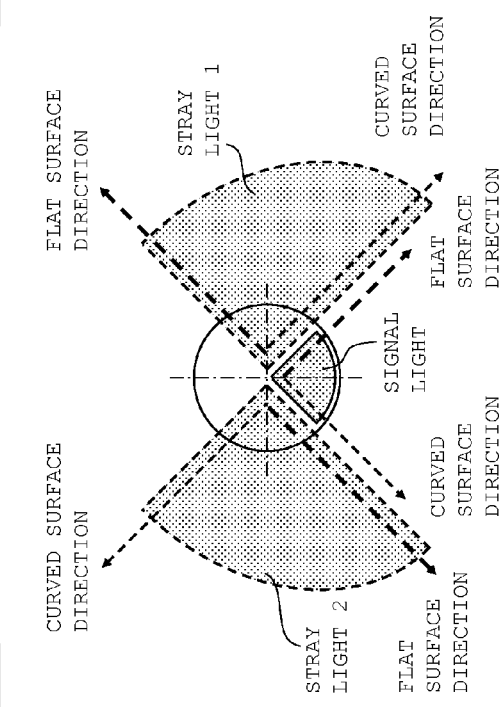
FIG. 4D LIGHT FLUX STATE ON AREA D

PROPAGATING DIRECTION CHANGING FUNCTION TO BE PROVIDED ON EACH OF LIGHT FLUX AREAS

LIGHT FLUXES ON PLANE S0

FE = (A+B+E+F) − (C+D+G+H)
PP = (A+B+G+H) − (C+D+E+F)

FE = (A+B+E+F) − (C+D+G+H)
PP = (A+B+G+H) − (C+D+E+F)

LIGHT FLUXES ON PLANE S0

LIGHT FLUXES ON PLANE S0

LIGHT FLUXES ON PLANE S0

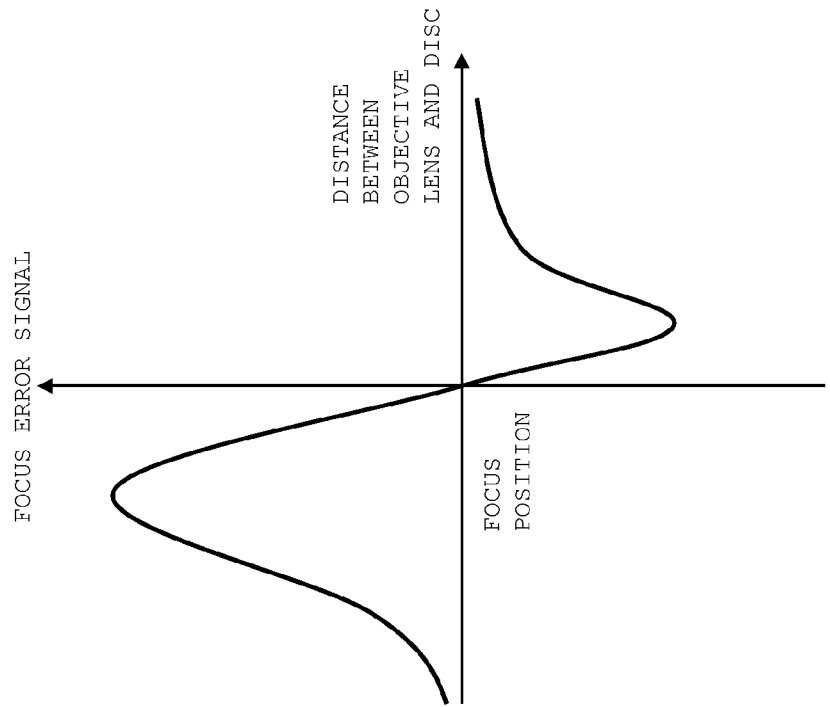
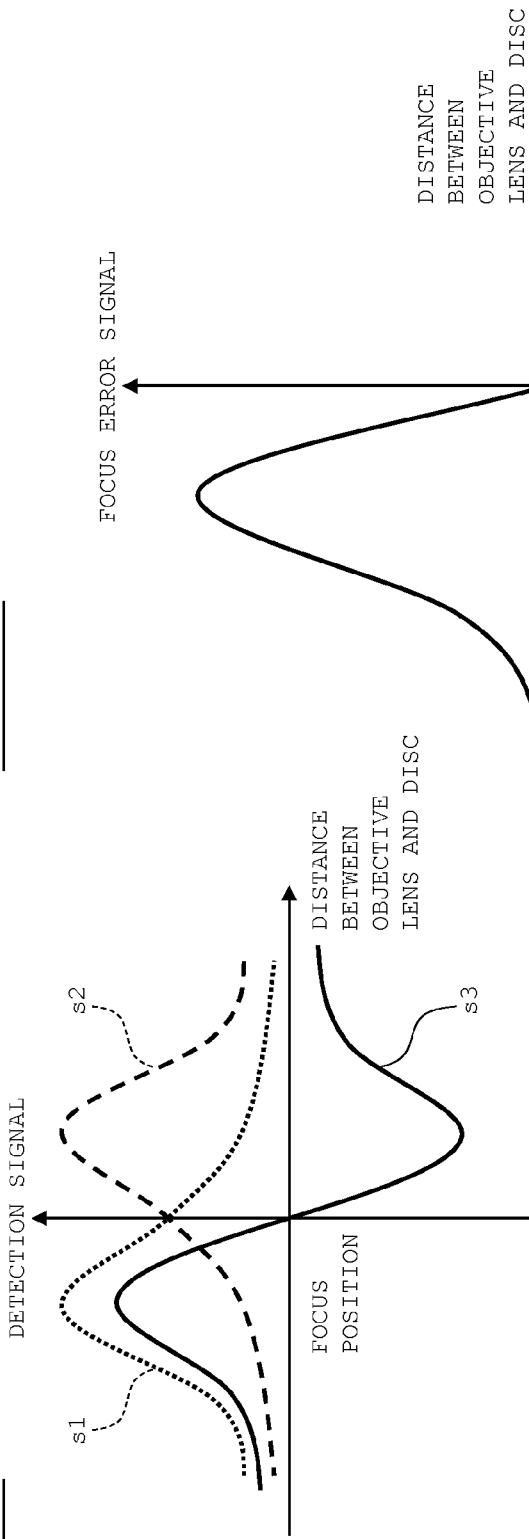
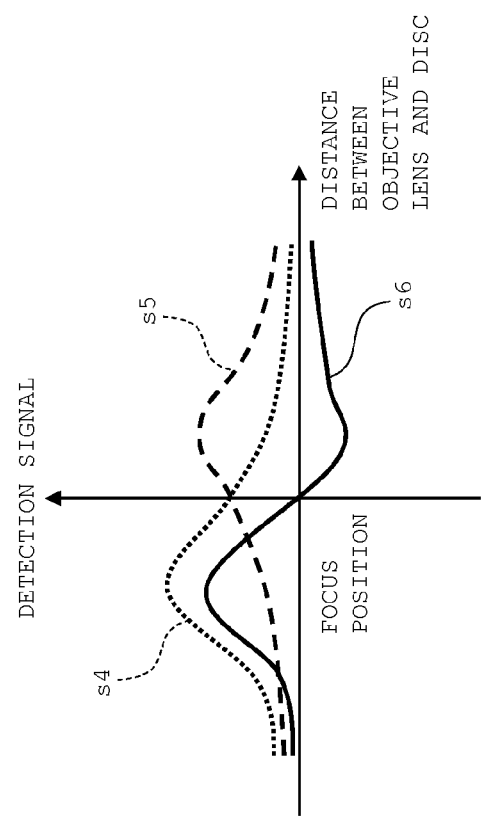

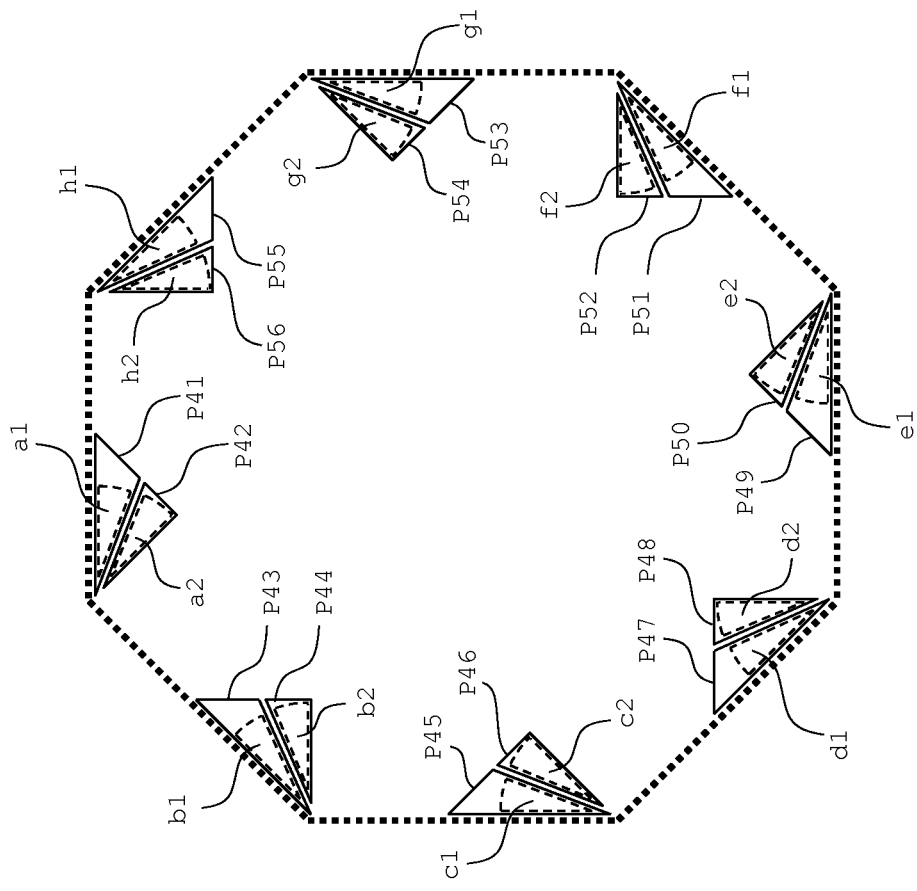
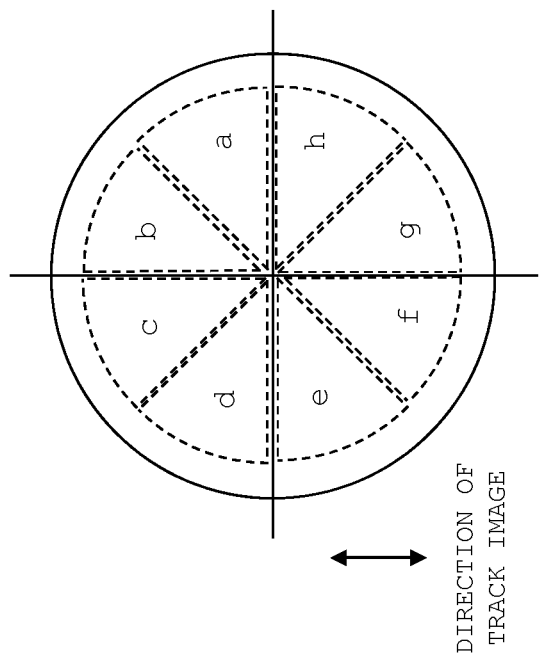
FIG. 15A
FIG. 15B

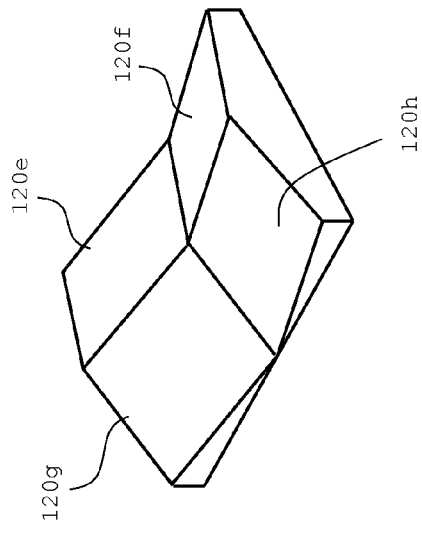
FIG. 17A
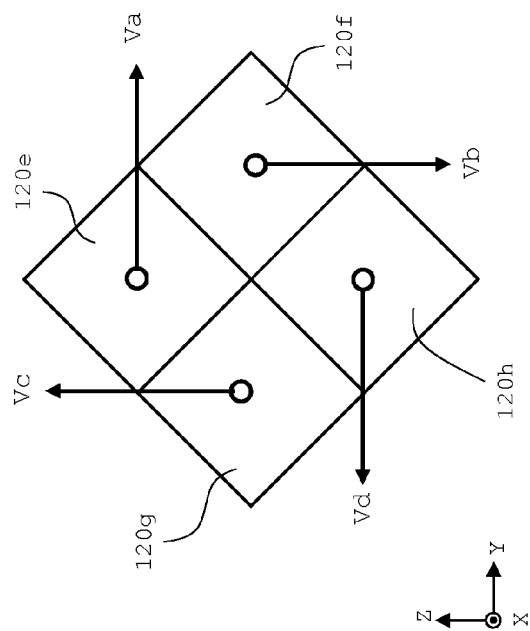
FIG. 17B
FIG. 17C
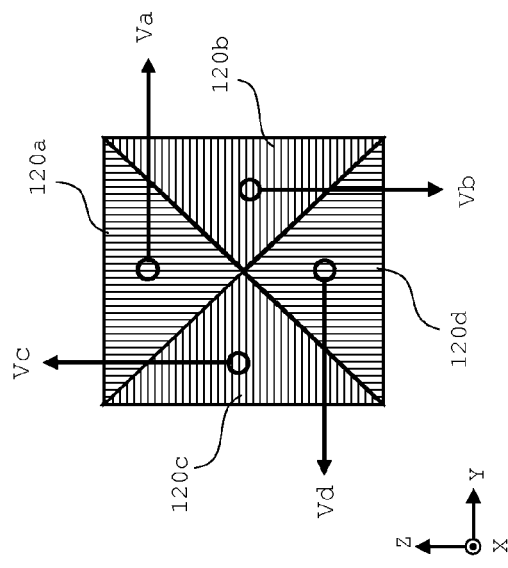

OPTICAL PICKUP DEVICE AND OPTICAL DISC DEVICE

This application claims priority under 35 U.S.C. Section 119 of Japanese Patent Application No. 2009-102440 filed Apr. 20, 2009, entitled "OPTICAL PICKUP DEVICE AND OPTICAL DISC DEVICE" and Japanese Patent Application No. 2009-109238 filed Apr. 28, 2009, entitled "OPTICAL PICKUP DEVICE AND OPTICAL DISC DEVICE". The disclosures of the above applications are incorporated herein by reference.

BACKGROUND OF THE INVENTION

1. Field of the Invention

The present invention relates to an optical pickup device and an optical disc device, and more particularly, relates to an optical pickup device and optical disc device suitable in use for recording to and reproducing from a recording medium having laminated recording layers.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

As a method for removing stray light, there is proposed a method using a pinhole. In this method, a pinhole is formed at a position where signal light is converged. In this method, an unwanted stray light component entered into a photodetector can be reduced, because a part of stray light is blocked by the pinhole. There is proposed a method using a half wavelength plate and a polarizing optical element in combination, as another method for removing stray light. In this method, a polarization direction of stray light is changed by the half wavelength plate, and the stray light is blocked by the polarizing optical element. This enables to prevent an unwanted stray light component from being entered into a photodetector.

However, in the method for removing stray light using a pinhole, it is necessary to accurately position the pinhole at a position where laser light (signal light) reflected on a targeted recording layer is converged. In this method, therefore, it is difficult to adjust the position of the pinhole. If the size of the pinhole is increased to easily adjust the position of the pinhole, stray light is more likely to pass through the pinhole, which obstructs the effect of suppressing signal deterioration resulting from stray light.

In the method for removing stray light by combined use of a half wavelength plate and a polarizing optical element, each two half wavelength plates and polarizing optical elements are necessary. In addition, two lenses are necessary to remove stray light. Thus, the number of parts and the cost are increased. Further, it is cumbersome to adjust the arrangement positions of these members. Furthermore, it is necessary to secure a space for arranging these members side by side, which may increase the size of an optical system.

SUMMARY OF THE INVENTION

A first aspect of the invention is directed to an optical pickup device for irradiating laser light onto a recording medium having a plurality of recording layers. The optical pickup device according to the first aspect includes a light source which emits laser light, an objective lens which converges the laser light on the recording medium, an astigmatism portion into which the laser light reflected on the recording medium is entered; a light flux separating portion, and a photodetector. The astigmatism portion is provided with a plurality of lens areas formed around an optical axis of the laser light. The astigmatism portion imparts astigmatism to the laser light individually with respect to each of the lens areas. The light flux separating portion makes propagating directions of a light flux of the laser light to be entered into each of the lens areas different from each other to separate the light fluxes from each other. The photodetector receives the separated light fluxes to output a detection signal.

A second aspect of the invention is directed to an optical disc device. The optical disc device according to the second aspect includes the optical pickup device according to the first aspect, and a computing circuit which processes an output from the photodetector.

BRIEF DESCRIPTION OF THE DRAWINGS

These and other objects, and novel features of the present invention will become more apparent upon reading the following detailed description of the embodiment along with the accompanying drawings.

FIGS. 1A through 1C are diagrams for describing a technical principle (a convergence state of light rays) in an embodiment of the invention.

FIGS. 2A through 2H are diagrams for describing the technical principle (distribution states of light fluxes) in the embodiment.

FIGS. 3A through 3D are diagrams for describing the technical principle (distribution states of signal light and stray light) in the embodiment.

FIGS. 4A through 4D are diagrams for describing the technical principle (distribution states of signal light and stray light) in the embodiment.

FIGS. 13A through 13C are diagrams for describing a focus error signal in modification example 1.

FIGS. 15A and 15B are diagrams for describing a method for arranging sensing portions in modification example 2.

FIGS. 17A through 17C are diagrams showing another modification example of the inventive example.

Figure 5A:
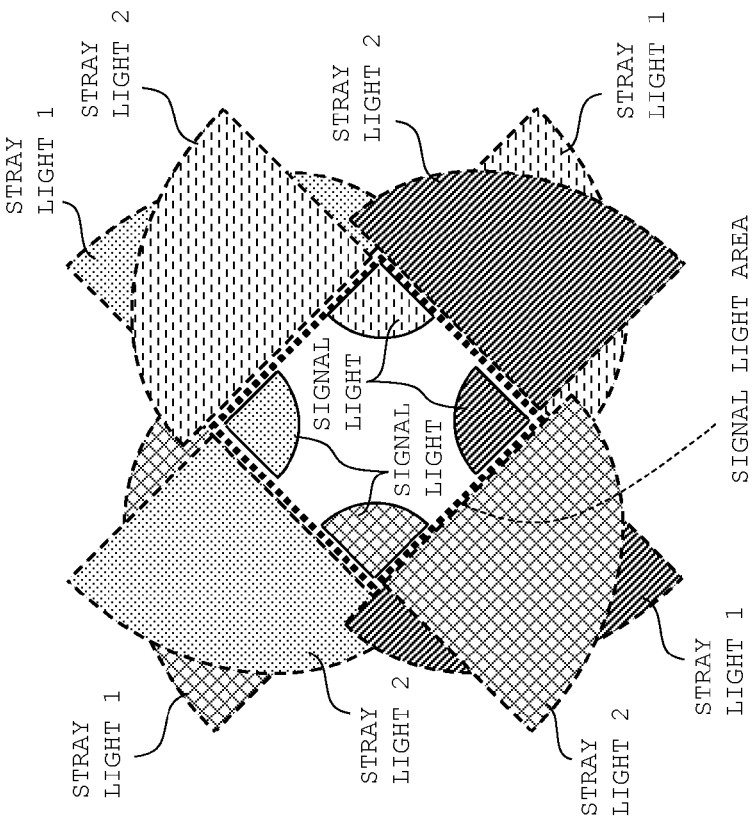
FIGS. 5A and 5B are diagrams for describing the technical principle (a method for separating light fluxes) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle which is applied to an embodiment of the invention is described referring to FIGS. 1A through 6D.

FIGS. 1A through 1C are diagrams showing a convergence state of light rays. FIG. 1A is a diagram showing a convergence state of laser light (signal light) reflected on a targeted recording layer, laser light (stray light 1) reflected on a layer away from a laser light incident side than the targeted recording layer, and laser light (stray light 2) reflected on a layer closer to the laser light incident side than the targeted recording layer. FIG. 1B is a diagram showing an arrangement of an anamorphic lens to be used in the principle of the embodiment. FIG. 1C is a diagram showing an arrangement of an anamorphic lens to be used in a focus adjusting method based on a conventional astigmatism method.

Referring to FIG. 1C, the anamorphic lens to be used in the conventional method converges laser light to be entered into the anamorphic lens parallel to an optical axis of the lens in a curved surface direction and a flat surface direction. In this embodiment, the curved surface direction and the flat surface direction are orthogonal to each other. Further, the curvature radius in the curved surface direction is smaller than the curvature radius in the flat surface direction, and accordingly, the effect of converging laser light to be entered into the anamorphic lens is larger in the curved surface direction than in the flat surface direction. To simplify the description on the astigmatism function of the anamorphic lens, in this embodiment, the terms "curved surface direction" and "flat surface direction" are used. Actually, however, the shape of the anamorphic lens in the "flat surface direction" in FIG. 1C is not limited to a flat shape, as far as the anamorphic lens is operable to form focal lines at different positions from each other. In the case where laser light is entered into the anamorphic lens in a convergence state, the shape of the anamorphic lens in the "flat surface direction" may be a linear shape (where the curvature radius=∞).

The anamorphic lens to be used in the principle of the embodiment is different from the anamorphic lens shown in FIG. 1C in the arrangement in the following points. Specifically, the anamorphic lens shown in FIG. 1C is divided into four areas A through D by two straight lines parallel to the flat surface direction and the curved surface direction. As shown in FIG. 1B, the anamorphic lens to be used in the principle of the embodiment is configured in such a manner that the lens configurations i.e. the lens curved surfaces of areas A and D among the four areas A through D are replaced with each other in the curved surface direction and the flat surface direction. The lens configurations of the areas B and C in FIG. 1B are the same as those of the areas B and C of the anamorphic lens shown in FIG. 1C.

Figure 11B:
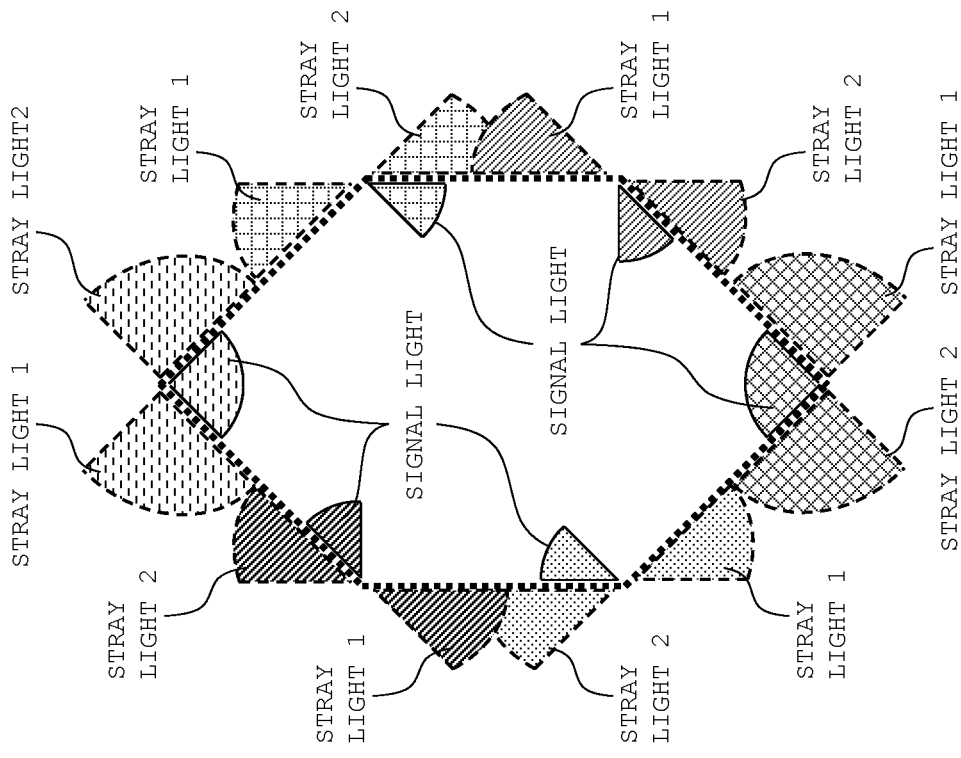
FIGS. 11A and 11B are diagrams for describing a distribution of light fluxes in modification example 1.
Figure 11A:
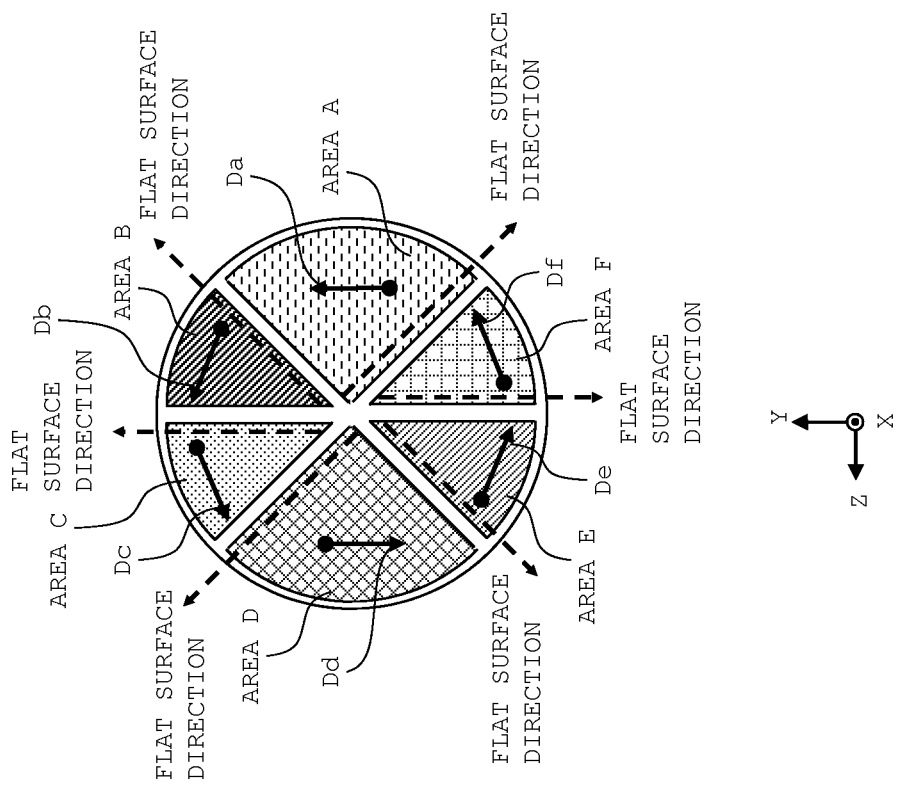
Figure 14A:
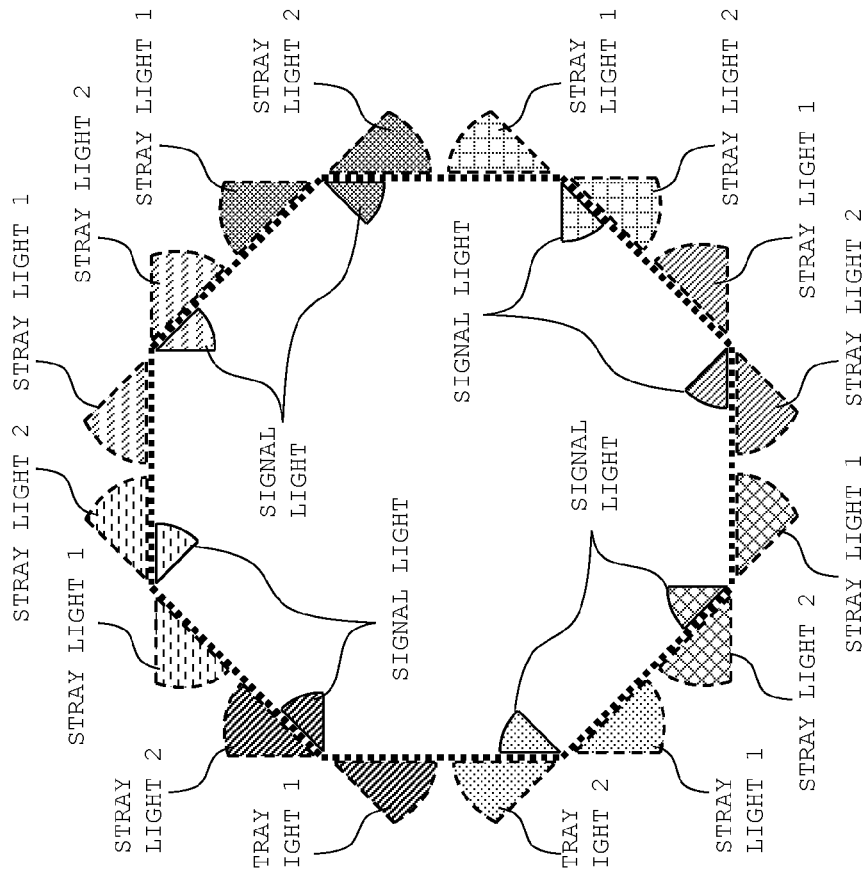
FIGS. 14A and 14B are diagrams for describing a distribution of light fluxes in modification example 2.

The anamorphic lens to be used in the principle of the embodiment may have arrangements as shown in e.g. FIGS. 11A and 14A, other than the arrangement shown in FIG. 1B. The anamorphic lenses shown in FIGS. 11A and 14A will be described later in detail.

Referring to FIG. 1A, signal light converged by the anamorphic lens forms focal lines at different positions from each other by convergence in the curved surface direction and the flat surface direction. The focal line position (S1) by convergence in the curved surface direction is closer to the anamorphic lens than the focal line position (S2) by convergence in the flat surface direction. The convergence position (S0) of signal light to be described later is an intermediate position between the focal line positions (S1) and (S2) by convergence in the curved surface direction and the flat surface direction.

Similarly to the above, the focal line position (M11) by convergence of stray light 1 by the anamorphic lens in the curved surface direction is closer to the anamorphic lens than the focal line position (M12) by convergence of stray light 1 in the flat surface direction. In view of the above, the anamorphic lens is designed in such a manner that the focal line position (M12) by convergence of stray light 1 in the flat surface direction is to the anamorphic lens than the focal line position (S1) by convergence of signal light in the curved surface direction.

Similarly to the above, the focal line position (M21) by convergence of stray light 2 in the curved surface direction is closer to the anamorphic lens than the focal line position (M22) by convergence of stray light 2 in the flat surface direction. In view of the above, the anamorphic lens is further designed in such a manner that the focal line position (M21) by convergence of stray light 2 in the curved surface direction is away from the anamorphic lens than the focal line position (S2) by convergence of signal light in the flat surface direction.

A beam spot of signal light becomes a least circle of confusion at the convergence position (S0) between the focal line position (S1) and the focal line position (S2).

FIGS. 2A through 2H are diagrams showing distribution states of signal light on respective observation planes perpendicular to an optical axis of laser light. The terms "area A" through "area D" in FIGS. 2A through 2H denote light flux areas of signal light to be entered into the areas A through D of the anamorphic lens shown in FIG. 1B. In FIG. 2A through 2H, the terms "curved" and "flat" respectively denote "curved surface direction" and "flat surface direction" in the areas A through D of the anamorphic lens.

FIGS. 2A, 2C, 2E, and 2G are diagrams respectively showing distribution states of signal light, in the case where the observation planes are located at the position of the anamorphic lens, the focal line position (S1), the convergence position (S0), and the focal line position (S2). Further, FIGS. 2B, 2D, and 2F are diagrams respectively showing distribution states of signal light, in the case where the observation planes are located at a position between the anamorphic lens and the focal line position (S1), a position between the focal line position (S1) and the convergence position (S0), and a position between the convergence position (S0) and the focal line position (S2). FIG. 2H is a diagram showing a distribution state of signal light, in the case where the observation plane is located at a position away from the anamorphic lens than the focal line position (S2).

Light in each of the light flux areas shown in FIG. 2A is subjected to convergence in the curved surface direction and the flat surface direction by a lens portion corresponding to each of the areas of the anamorphic lens. As described above, since the convergence function in the curved surface direction is larger than the convergence function in the flat surface direction, the shapes of light in each of the light flux areas are changed resulting from the difference in the convergence function, as shown in FIGS. 2B through 2H, as the light is propagated.

As shown in FIGS. 2C and 2G, light in each of the light flux areas has a linear shape (forms a focal line) at the focal line positions (S1) and (S2). Further, as shown in FIG. 2E, signal light has a circular shape (forms a least circle of confusion) at the convergence position (S0). Furthermore, as shown in FIG. 2D, after passing the focal line position (S1), light in each of the light flux areas partly enters into an adjacent area crossing over one of two parting lines which divides the total light flux into four. Furthermore, after passing the focal line position (S2), as the light is propagated, light in each of the light flux areas is changed in such a manner that the size of the corresponding light flux area is increased.

In FIGS. 2A through 2H, only the distribution states of signal light are shown. Similarly to signal light, distribution states of stray light 1 and stray light 2 are changed depending on a positional relation between the observation planes, and the focal line positions defined by convergence of light in the curved surface direction and the flat surface direction.

Next, a relation between irradiation areas of signal light and stray light 1 and 2 on a plane S0 is described, considering the above.

As shown in FIG. 3A, the anamorphic lens is divided into four areas A through D. The shapes of reflection light (signal light, and stray light 1 and 2) from a disc are changed as described above referring to FIGS. 2A through 2H by convergence of the anamorphic lens. As described above, signal light in the light flux areas A through D is distributed on the plane S0 as shown in FIGS. 3B. Further, since stray light 1 has an irradiation state on the plane S0 as shown in FIG. 2H, stray light 1 in the light flux areas A through D is distributed on the plane S0 as shown in FIG. 3C. Since stray light 2 has an irradiation state on the plane S0 as shown in FIG. 2B, stray light 2 in the light flux areas A through D is distributed on the plane S0 as shown in FIG. 3D.

In this embodiment, if signal light, and stray light 1 and 2 are extracted on the plane S0 with respect to each of the light flux areas, the distributions of signal light, and stray light 1 and 2 are as shown in FIGS. 4A through 4D. In this case, signal light in each of the light flux areas is not superimposed on any of stray light 1 and 2 in the corresponding light flux area. Accordingly, separating the light fluxes (signal light, and stray light 1 and 2) in each of the light flux areas in different directions from each other, and then allowing only signal light to be received by a corresponding sensing portion enables to realize incidence of only signal light on the corresponding sensing portion, while preventing incidence of stray light. This enables to avoid deterioration of a detection signal resulting from stray light.

As described above, dispersing light passing the areas A through D, and separating the light on the plane S0 from each other enables to extract only signal light. The embodiment is made based on the above principle.

Figure 5B:
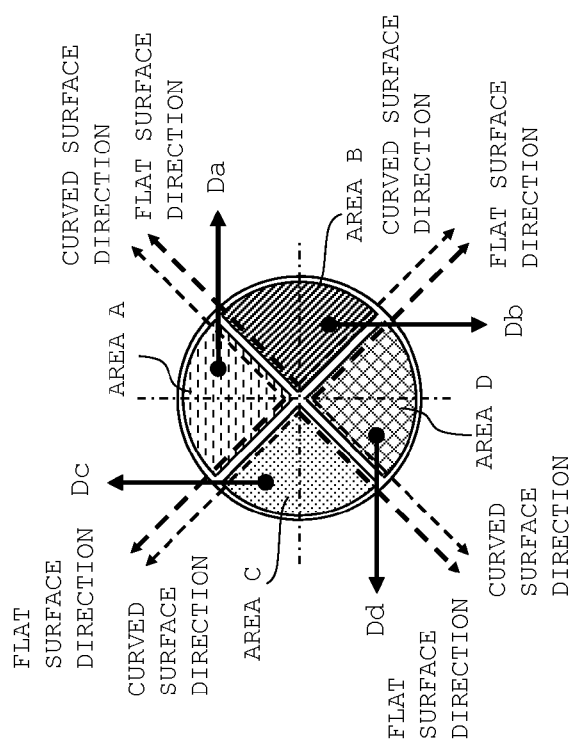

FIGS. 5A and 5B are diagrams showing distribution states of signal light, and stray light 1 and 2 on the plane S0, in the case where the propagating directions of light fluxes (signal light, and stray light 1 and 2) passing the four areas A through D shown in FIG. 3A are changed by a certain angle in different directions from each other. FIG. 5A is a diagram of the anamorphic lens, when viewed in the optical axis direction (the propagating direction of laser light at the time of incidence into the anamorphic lens) of the anamorphic lens, and FIG. 5B is a diagram showing distribution states of signal light, and stray light 1 and 2 on the plane S0.

In FIG. 5A, the propagating directions of light fluxes (signal light, and stray light 1 and 2) passing the areas A through D are respectively changed into directions Da, Db, Dc, and Dd with respect to the propagating directions of the respective light fluxes before incidence by a certain angle amount α (not shown). The directions Da, Db, Dc, and Dd are respectively inclined by an angle of 45° with respect to boundaries between the areas A and B, the areas B and C, the areas C and D, and the areas D and A.

In the above arrangement, signal light, and stray light 1 and 2 in each of the light flux areas can be distributed on the plane S0, as shown in FIG. 5B, by adjusting the angle amount α with respect to the directions Da, Db, Dc, and Dd. As a result, as shown in FIG. 5B, a signal light area where only signal light exists can be defined on the plane S0. Arranging sensing portions of a photodetector at a position corresponding to the signal light area allows only signal light in each of the areas to be received by the corresponding sensing portions of the photodetector.

Figure 6A:
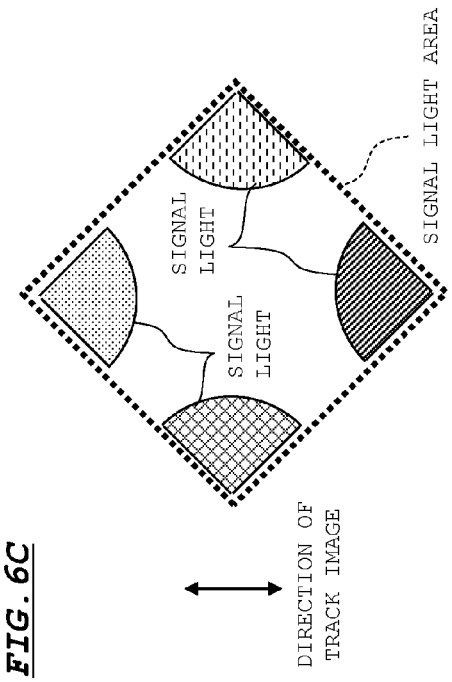
FIGS. 6A through 6D are diagrams showing a method for arranging sensing portions in the embodiment.
Figure 6C:
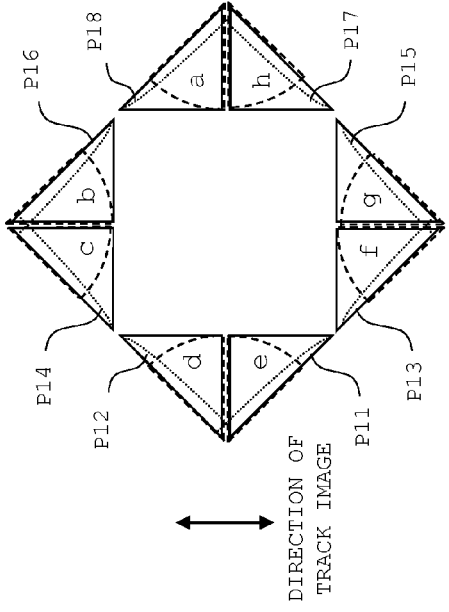
Figure 6B:
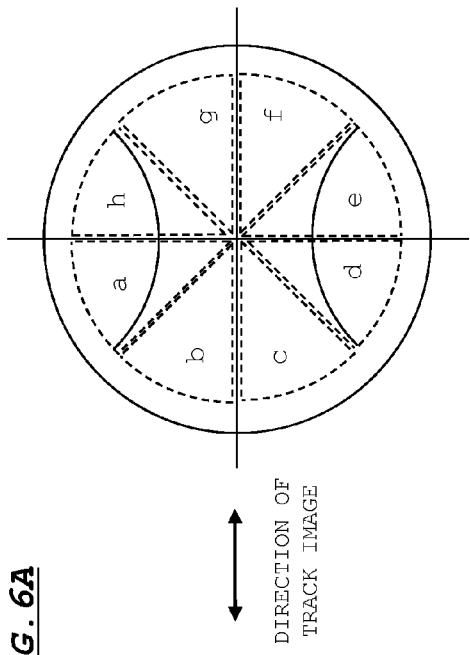
Figure 6D:
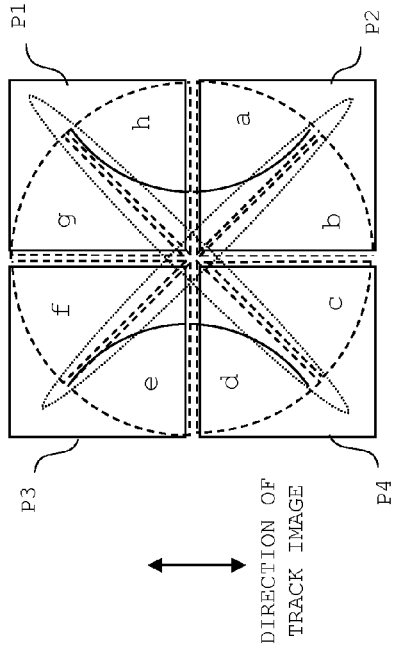

FIGS. 6A through 6D are diagrams for describing a method for arranging sensing portions of a photodetector. FIG. 6A is a diagram showing a light flux area of reflection light (signal light) from a disc. FIG. 6B is a diagram showing a distribution state of signal light on a photodetector (a four-division sensor), in the case where an anamorphic lens based on a conventional astigmatism method and the photodetector are respectively disposed at the arrangement position of the anamorphic lens and the plane S0 in the arrangement shown in FIG. 1A. FIGS. 6C and 6D are diagrams showing distribution states of signal light and arrangements of sensing portions on the plane S0 based on the above principle.

Referring to FIGS. 6A through 6D, a direction of an image (a track image) obtained by diffraction of signal light by a track groove is inclined by 45 degrees with respect to the flat surface direction and the curved surface direction. Referring to FIG. 6A, assuming that the direction of a track image is aligned with a transverse direction, the direction of a track image derived from signal light is aligned with a vertical direction in FIGS. 6B through 6D. To simplify the description, a light flux is divided into eight light flux areas "a" through "h" in FIGS. 6A and 6B. Further, the track image is shown by the solid line, and the beam shape in an off-focus state is shown by the dotted line. It is known that a superimposed state of a 0-th order diffraction image and a first order diffraction image of signal light by the track groove is obtained by the ratio: wavelength/(track pitch×NA of an objective lens). As shown in FIGS. 6A, 6B, and 6D, a condition for forming a first order diffraction image in the four light flux areas "a", "d", "e", and "h" is expressed by: wavelength/(track pitch×NA of an objective lens)>√2.

In the conventional astigmatism method, sensing portions P1 through P4 of a photodetector (a four-division sensor) are set as shown in FIG. 6B. In this arrangement, a focus error signal FE and a push-pull signal (a tracking signal) PP are obtained by implementing the following equations (1) and (2):

$$FE=(A+B+E+F)-(C+D+G+H) \quad (1)$$

$$PP=(A+B+G+H)-(C+D+E+F) \quad (2)$$

where A through H are detection signal components based on light intensities of light flux areas "a" through "h".

On the other hand, as described above, signal light is distributed in the signal light area as shown in FIG. 6C, in the distribution state shown in FIG. 5B. In this case, signal light passing the light flux areas "a" through "h" shown in FIG. 6A is as shown in FIG. 6D. Specifically, signal light passing the light flux areas "a" through "h" in FIG. 6A is guided to light flux areas "a" through "h" shown in FIG. 6D on the plane S0 where the sensing portions of the photodetector are disposed.

Accordingly, setting sensing portions P11 through P18 as shown in an overlapped state in FIG. 6D on the positions corresponding to the light flux areas "a" through "h" shown in FIG. 6D enables to generate a focus error signal and a push-pull signal by performing the same computation as the computation described referring to FIG. 6B. Specifically, similarly to the case of FIG. 6B, a focus error signal FE and a push-pull signal PP can be obtained by implementing the equations (1) and (2), wherein A through H are detection signals from the sensing portions for receiving light fluxes in the light flux areas "a" through "h".

As described above, according to the principle of the embodiment, a focus error signal and a push-pull signal (a tracking error signal), with an influence of stray light being suppressed, can be generated by performing the same computation as applied in the conventional astigmatism method.

As already described, the anamorphic lens to be used in the principle of the embodiment may have the arrangements as shown in FIGS. 11A and 14A. Specifically, the anamorphic lens to which the principle of the embodiment is applicable, has plural lens areas formed around the optical axis of laser light, and is configured to impart astigmatism to laser light individually with respect to each of the lens areas. The anamorphic lens is configured in such a manner that a light flux is converged in a direction (e.g. the flat surface direction in FIGS. 1B, 11A, and 14A) parallel to one of two boundaries defined by each one of the lens areas and the other two lens areas adjacent to the one lens area around the optical axis of laser light to form a focal line at a position of a first focal length; and that a light flux is converged in the direction perpendicular to the boundary to form a focal line at a position of a second focal length different from the first focal length.

Preferably, the anamorphic lens has four or more lens areas, and the angle of each of the lens areas to be formed around the optical axis is set to 90 degrees or less. The preferred arrangement enables to prevent stray light from entering into the signal light area, as shown in e.g. FIG. 5B.

EXAMPLE

In this section, an example of the invention based on the above principle is described.

Figure 7:
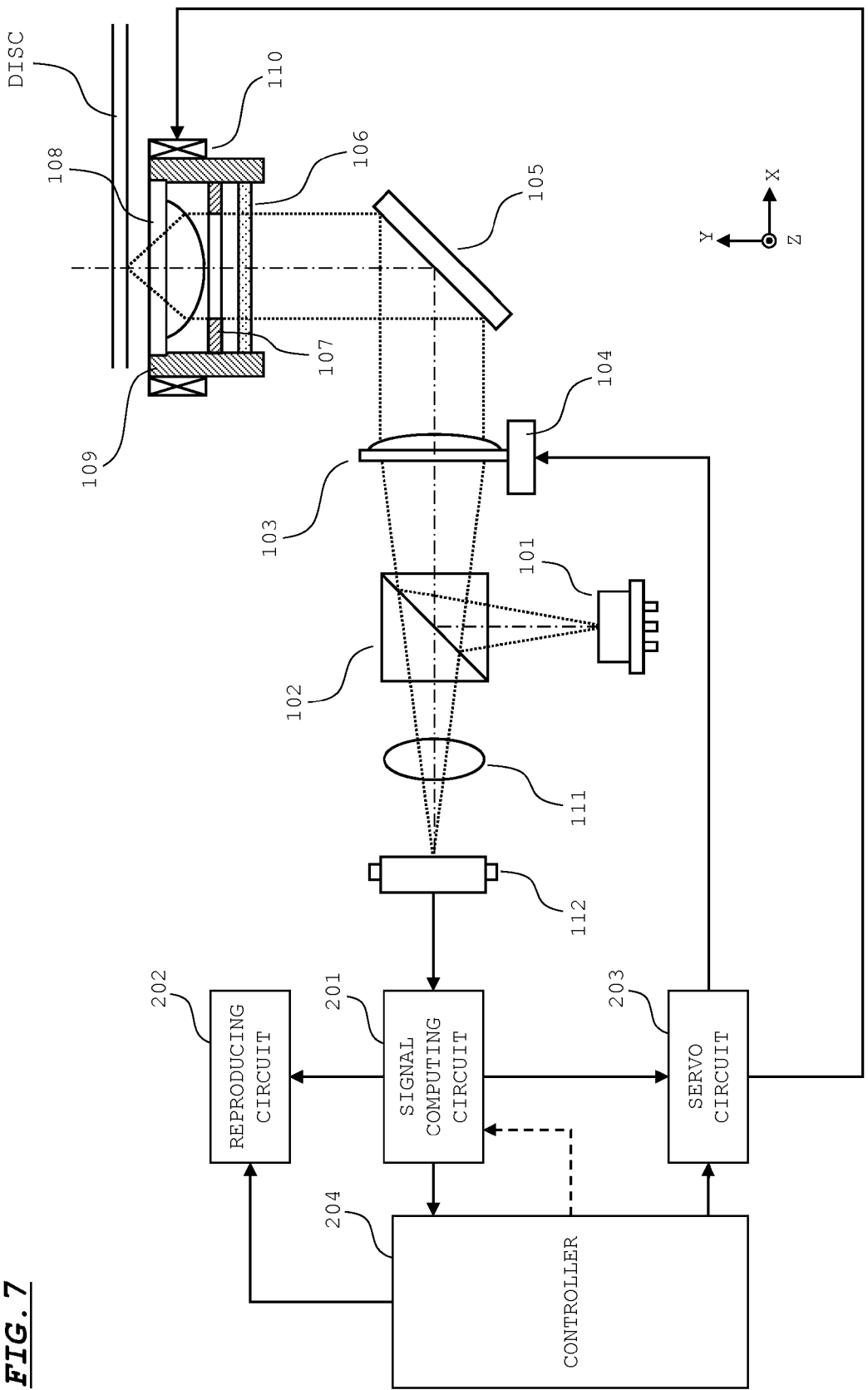
FIG. 7 is a diagram showing an optical system of an optical pickup device as an example in the invention.

FIG. 7 is a diagram showing an optical system of an optical pickup device, as an example of the invention. For sake of convenience, a relevant circuit configuration is also shown in FIG. 7. A disc in FIG. 7 is formed by laminating plural recording layers.

As shown in FIG. 7, the optical system of the optical pickup device includes a semiconductor laser 101, a polarized beam splitter 102, a collimator lens 103, a lens actuator 104, a rise-up mirror 105, a quarter wavelength plate 106, an aperture 107, an objective lens 108, a holder 109, an objective lens actuator 110, an anamorphic lens 111, and a photodetector 112.

The semiconductor laser 101 emits laser light of a predetermined wavelength. The divergence angle of laser light to be emitted from the semiconductor laser 101 is such that a horizontal divergence angle and a vertical divergence angle are different from each other.

The polarized beam splitter 102 substantially totally reflects laser light (S-polarized light) to be entered from the semiconductor laser 101, and substantially totally transmits laser light (P-polarized light) to be entered from the collimator lens 103. The collimator lens 103 converts laser light to be entered from the polarized beam splitter 102 into parallel light.

The lens actuator 104 displaces the collimator lens 103 in an optical axis direction in accordance with a servo signal to be inputted from a servo circuit 203. Accordingly, aberration generated in the laser light is corrected. The rise-up mirror 105 reflects the laser light entered from the collimator lens 103 in a direction toward the objective lens 108.

The quarter wavelength plate 106 converts laser light directed to the disc into circularly polarized light, and converts reflection light from the disc into linearly polarized light orthogonal to a polarization direction toward the disc. Accordingly, the laser light reflected on the disc is transmitted through the polarized beam splitter 102.

The aperture 107 adjusts the beam shape of laser light into a circular shape to properly set the effective diameter of laser light with respect to the objective lens 108. The objective lens 108 is designed in such a manner as to properly converge laser light onto a targeted recording layer in the disc. The holder 109 integrally holds the quarter wavelength plate 106 and the objective lens 108. The objective lens actuator 110 is constituted of a conventional well-known electromagnetic drive circuit. A coil portion such as a focus coil of the electromagnetic drive circuit is mounted on the holder 109.

The anamorphic lens 111 imparts astigmatism to reflection light from the disc. Specifically, the anamorphic lens 111 is configured in such a manner that the curved surface direction and the flat surface direction are defined as described referring to FIG. 1B. Further, the anamorphic lens 111 has a function of changing the propagating direction of laser light entered from the polarized beam splitter 102 in the manner as described referring to FIG. 5A. The anamorphic lens 111 having the above function is operable to change the propagating directions of light fluxes passing the areas A through D shown in FIG. 5A, out of the laser light entered into the anamorphic lens 111, by a certain angle amount α. The angle amount α is defined to such a value that the distribution state of signal light, and stray light 1 and 2 on the plane S0 becomes the distribution state shown in FIG. 5B.

The photodetector 112 has the sensing portions P11 through P18 shown in FIG. 6D. The photodetector 112 is arranged at such a position that the sensing portions P11 through P18 are located on the plane S0 shown in FIG. 1A. The sensing portions P11 through P18 of the photodetector 112 respectively receive light fluxes passing the light flux areas "a" through "h" shown in FIG. 6D.

A signal computing circuit 201 performs a computation with respect to detection signals outputted from the eight sensing portions of the photodetector 112 in accordance with the equation (1), and generates a focus error signal. Further, the signal computing circuit 201 generates a reproduction RF signal by summing up the detection signals outputted from the eight sensing portions. Furthermore, the signal computing circuit 201 performs a computation with respect to the detection signals outputted from the eight sensing portions of the photodetector 112 in accordance with the equation (2), and generates a push-pull signal PP (a tracking error signal). The focus error signal and the push-pull signal PP are transmitted to the servo circuit 203, and the reproduction RF signal is transmitted to a reproducing circuit 202 and the servo circuit 203.

The reproducing circuit 202 demodulates the reproduction RF signal inputted from the signal computing circuit 201, and generates reproduction data. The servo circuit 203 generates a tracking servo signal and a focus servo signal based on the push-pull signal PP and the focus error signal inputted from the signal computing circuit 201, and outputs the tracking servo signal and the focus servo signal to the objective lens actuator 110. The servo circuit 203 also outputs a servo signal to the lens actuator 104 to optimize the quality of the reproduction RF signal inputted from the signal computing circuit 201. A controller 204 controls the respective parts in accordance with a program incorporated in an internal memory provided in the controller 204.

The signal computing circuit 201 shown in FIG. 7 may be provided in the optical pickup device or in the optical disc device. Further alternatively, a part of the circuit section constituting the signal computing circuit 201 may be provided in the optical pickup device, and the remainder thereof may be provided in the optical disc device.

Figure 8B:
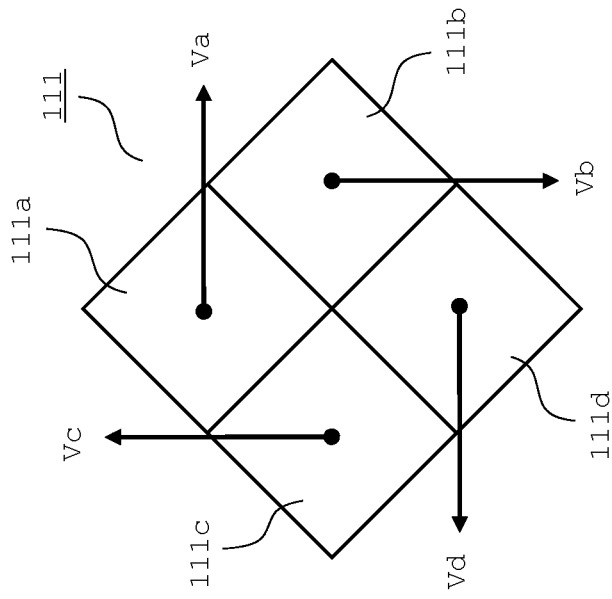
FIGS. 8A and 8B are diagrams showing a construction example of an anamorphic lens in the inventive example.
Figure 8A:
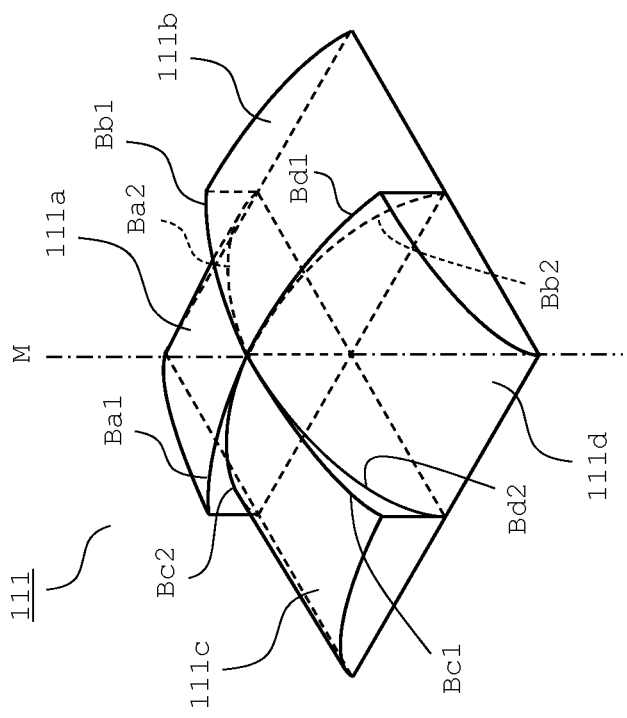

FIGS. 8A and 8B are diagrams showing an arrangement example of the anamorphic lens 111. FIG. 8A is a perspective view of the anamorphic lens 111, and FIG. 8B is a diagram of the anamorphic lens 111, when viewed in the optical axis direction of reflection light and from the side of the polarized beam splitter 102.

Referring to FIG. 8A, the anamorphic lens 111 has lens areas 111a through 111d having different curved surface shapes from each other on an incident surface side thereof. The lens areas 111a through 111d each has a function of imparting astigmatism to light to be entered along an optical axis M, and a function of changing the propagating direction of light.

Concerning the astigmatism function, the lens areas 111a through 111d are designed in such a manner that a light flux in each one of the lens areas 111a through 111d is converged in a direction (the flat surface direction) parallel to one boundary Ba1, Bb1, Bc1, and Bd1 of two boundaries defined between the one lens area, and the other two lens areas adjacent to the one lens area around the optical axis of laser light to form a focal line at the focal line position (S2) shown in FIG. 1A; and that a light flux is converged in a direction (the curved surface direction) perpendicular to the boundary Ba1, Bb1, Bc1, and Bd1 to form a focal line at the focal line position (S1) different from the focal line position (S2). The lens areas 11a through 11d are also designed in such a manner that the boundary Ba1, Bb1, Bc1, and Bd1 parallel to the flat surface direction of each of the lens areas is in proximity to a boundary Ba2, Bb2, Bc2, and Bd2 of the corresponding adjacent lens area, and that these boundaries Ba1, Bb1, Bc1, and Bd1 are not in proximity to each other.

Concerning the propagating direction changing function, the lens areas 11a through 11d are designed in such a manner that, as shown in FIG. 8B, the propagating directions of laser light to be entered into the lens areas 111a through 111d are respectively changed into directions Va through Vd.

The astigmatism function and the propagating direction changing function are adjusted in such a manner that laser light (signal light, and stray light 1 and 2) passing the lens areas 111a through 111d is distributed on a light receiving surface of the photodetector 112, as shown in FIG. 5B, in a state that laser light is focused on a targeted recording layer. Accordingly, laser light (signal light, and stray light 1 and 2) to be entered into the lens areas 111a through 111d can be properly received on the sensing portions of the photodetector 112. The boundary between the corresponding adjacent lens areas is inclined with respect to the direction of a track image by 45 degrees.

As described above, according to the inventive example, it is possible to prevent signal light reflected on a targeted recording layer out of the recording layers in a disc, and stray light 1 and 2 reflected on recording layers away from and closer to the targeted recording layer from superimposing one over the other on the light receiving surface (the plane S0 where the beam spot of signal light becomes a least circle of confusion in an on-focus state) of the photodetector 112. Specifically, it is possible to make a distribution state of signal light, and stray light 1 and 2 on the light receiving surface (the plane S0), as shown in FIG. 5B. Accordingly, arranging the sensing portions P11 through P18 shown in FIG. 6D at a position corresponding to the signal light area shown in FIG. 5B enables to receive only the corresponding signal light on the respective sensing portions P11 through P18. This enables to suppress deterioration of a detection signal resulting from stray light.

Further, the above effects can be obtained by merely disposing the anamorphic lens 111 shown in FIGS. 8A and 8B on an optical path of laser light reflected on a disc, specifically, between the polarized beam splitter 102 and the photodetector 112 in the arrangement shown in FIG. 7, in place of using the conventional anamorphic lens. Thus, the inventive example is advantageous in effectively removing an influence resulting from stray light, with a simplified arrangement.

Further, since the anamorphic lens 111 has both of the astigmatism function and the propagating direction changing function, the inventive example is advantageous in simplifying the arrangement, as compared with a case that an anamorphic lens only having an astigmatism function and an additional optical element having a propagating direction changing direction are arranged.

Furthermore, in the inventive example, as shown in FIG. 6C, the signal light area has a square shape, and signal light is irradiated to positions corresponding to vertices of the square. This arrangement enables to make the area for arranging the sensing portions compact, and makes it easy to arrange the sensing portions.

Figure 9A:
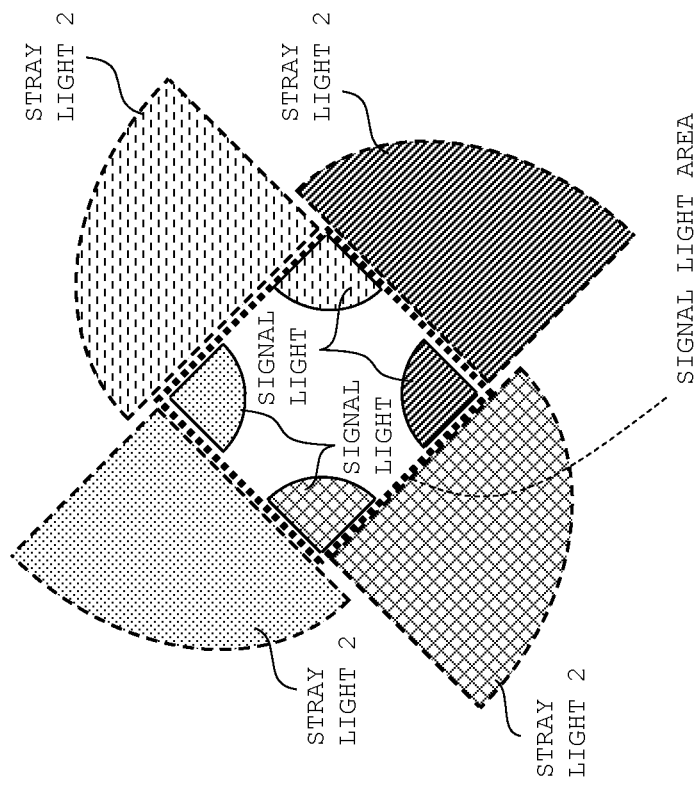
FIGS. 9A and 9B are diagrams showing a distribution state of signal light and stray light, in the case where a disc has two recording layers in the inventive example.
Figure 9B:
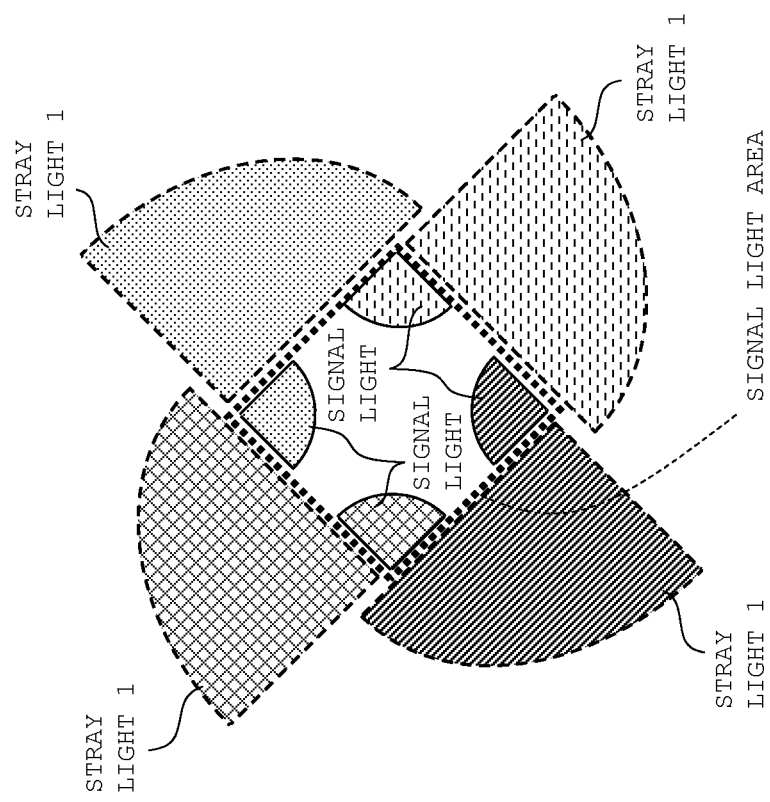

In the case where the optical pickup device and the optical disc device as the inventive example are used in recording or reproducing on or from an optical disc having only two recording layers, the distribution state of stray light becomes the state as shown in FIGS. 9A and 9B because there is only one recording layer other than a targeted recording layer. FIGS. 9A and 9B respectively show distribution states, in the case where laser light is focused on a recording layer at a forward position and a recording layer at a rearward position with respect to the targeted recording layer.

In the above case, as shown in FIGS. 9A and 9B, there is no likelihood that stray light may be superimposed one over the other. Accordingly, there is no likelihood that stray light may be interfered with each other, or stray light amplified by coherence may be leaked into a signal light area, which may result in deterioration of a detection signal. Thus, the inventive example is advantageous in effectively suppressing deterioration of a detection signal resulting from coherence of stray light, as well as the above effect.

In the case where there is only one recording layer, substantially the same effect as above can be obtained. Specifically, in the case where there is only one recording layer, if a focus position of laser light is displaced from the recording layer, reflection light from the disc may be partly entered into the area of stray light shown in FIGS. 9A and 9B. In this case, however, there is no likelihood that reflection light partly entered into the area of stray light may be superimposed one over the other. Accordingly, there is no likelihood that reflection light partly entered into the area of stray light may be interfered with each other. Thus, the above arrangement enables to generate a high-quality signal from the sensing portions arranged in the signal light area.

The stray light removal effect based on the above principle can be obtained, in the case where the focal line position (M12) of stray light 1 in the flat surface direction is closer to the anamorphic lens 111 than the plane S0, and the focal line position (M21) of stray light 2 in the curved surface direction is away from the anamorphic lens 111 than the plane S0, referring to FIG. 1A. Specifically, as far as the above relation is satisfied, the distribution state of signal light, and stray light 1 and 2 becomes the state as shown in FIG. 5A, which makes it possible to prevent signal light, and stray light 1 and 2 from being superimposed one over the other on the plane S0. In other words, as far as the above relation is satisfied, even if the focal line position (M12) of stray light 1 in the flat surface direction comes closer to the plane S0 than the focal line position (S1) of signal light in the curved surface direction, or the focal line position (M21) of stray light 2 in the curved surface direction comes closer to the plane S0 than the focal line position (S2) of signal light in the flat surface direction, the effects of the invention and the inventive example based on the above principle can be obtained.

Method for Adjusting Positions of Photodetector and Anamorphic Lens

In the inventive example, it is necessary to adjust the positions of the anamorphic lens 111 and the photodetector 112 to such positions that signal light, out of light fluxes (signal light, and stray light 1 and 2) passing the lens areas 111a through 111d shown in FIG. 8A is properly entered into the sensing portions P11 through P18 shown in FIG. 6D arranged on the photodetector 112. The positional adjustment can be performed by e.g. the following technique.

FIGS. 10A through 10D are diagrams showing a method for adjusting the positions of the anamorphic lens 111 and the photodetector 112.

The anamorphic lens 111 is configured in such a manner that the lens areas 111a through 111d have the dimensions large enough to receive reflection light fluxes from a disc in the vicinity of the arranged position of the anamorphic lens 111. Further, the photodetector 112 is configured in such a manner that sensing portions P11', P12', P13', P15', P17', and P18' are provided above the sensing portions P14 and P16 so that the positional adjustment of the photodetector 112 based on the conventional astigmatism method can be performed.

Figure 10C:
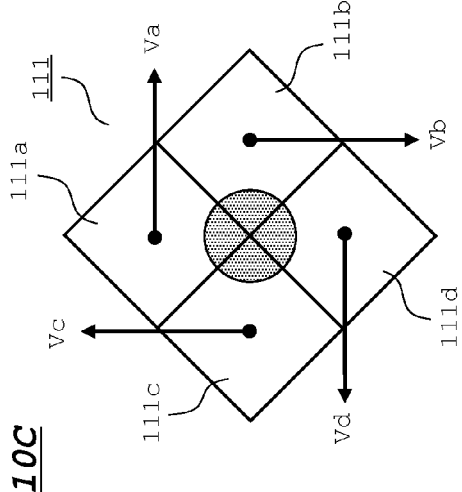
FIGS. 10A through 10D are diagrams showing a method for adjusting the positions of an anamorphic lens and a photodetector in the inventive example.
Figure 10D:
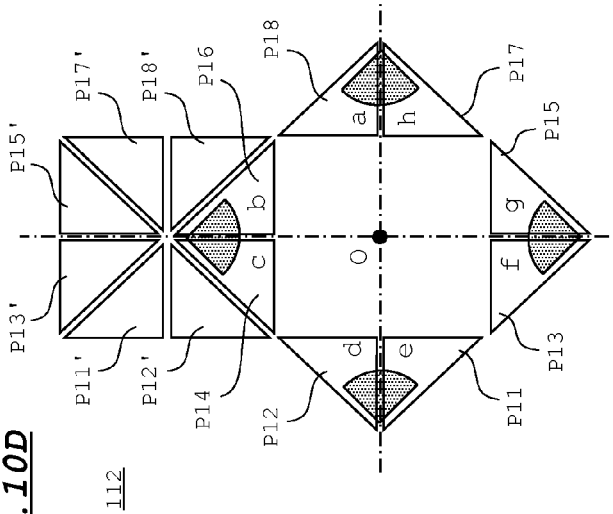
Figure 10A:
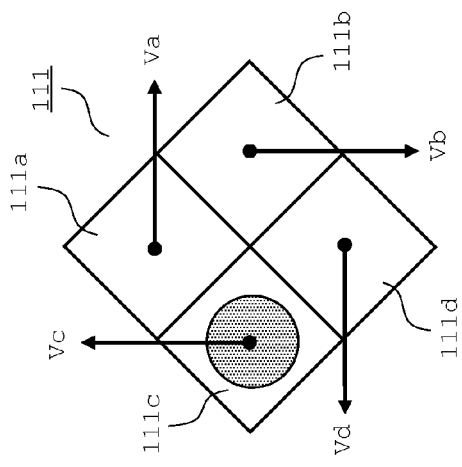

In adjusting the positions of the anamorphic lens 111 and the photodetector 112, first, as shown in FIG. 10A, the position of the anamorphic lens 111 is roughly adjusted so that a reflection light flux from a disc generally lies in the lens area 111c, and the anamorphic lens 111 is provisionally fixed thereat.

The reflection light flux entered into the lens area 111c from the disc is subjected to astigmatism by the lens area 111c, and the propagating direction of the reflection light flux is changed at the lens area 111c, without being separated by the anamorphic lens 111. Accordingly, the reflection light flux transmitted through the lens area 111c forms such a beam spot based on astigmatism that the reflection light flux has a circular shape in an on-focus state and an elliptical shape in an off-focus state on the light receiving surface of the photodetector 112.

Figure 10B:
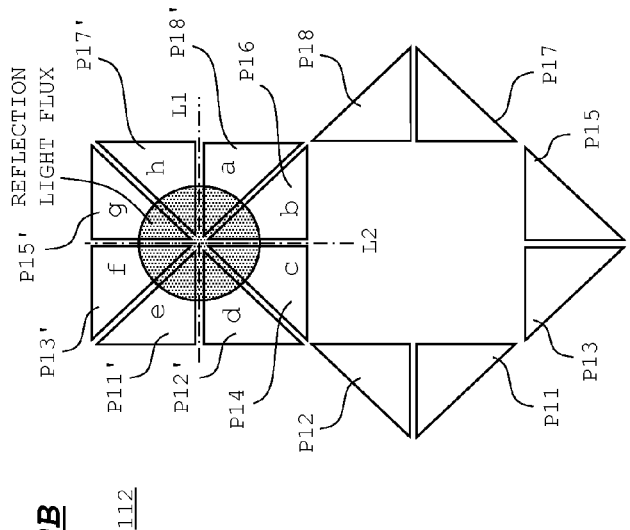

Next, the position of the photodetector 112 is adjusted by an adjustment method based on the conventional astigmatism method by using output signals from the sensing portions P14, P16, P11', P12', P13', P15', P17', and P18' in such a manner that the beam spot is properly detected by the photodetector 112, as shown in FIG. 10B; and the photodetector 112 is fixed at a proper position. In this case, the position of the photodetector 112 is adjusted, based on detection signals from four sensing areas divided by two parting lines L1 and L2. Accordingly, the centroid of the light flux can be aligned with a targeted position of the photodetector 112.

After the position of the photodetector 112 is determined, the position of the anamorphic lens 111, whose position has been provisionally fixed, is adjusted. Referring to FIGS. 10C and 10D, the anamorphic lens 111 is moved on a plane perpendicular to the optical axis, and fixed at such a position that signals to be detected from the sensing portions P11 through P18 of the photodetector 112 become equal to each other. By performing the above operation, the crossing point of the parting lines of the anamorphic lens 111, and the centroid of the reflection light flux can be precisely aligned with each other. Thus, both of the anamorphic lens 111 and the photodetector 112 can be fixed at the respective proper positions.

Modification Example 1

In the inventive example, light fluxes of signal light, and stray light 1 and 2 have the distribution state as shown in FIG. 5B on the plane S0 by the astigmatism function and the propagating direction changing function shown in FIG. 5A, and the light fluxes are received on the sensing portions shown in FIG. 6D. In modification example 1, it is possible to prevent light fluxes of signal light, and stray light 1 and 2 from being superimposed one over the other on the plane S0 by an astigmatism function and a propagating direction changing function different from those shown in FIG. 5A.

FIG. 11A is a diagram showing an arrangement of an anamorphic lens in modification example 1. The anamorphic lens in modification example 1 is divided into six areas around an optical axis. The areas A and D have an angle of 90 degrees in the circumferential direction of the optical axis, and the areas B, C, E, and F have an angle of 45 degrees in the circumferential direction of the optical axis. Each of the areas has an astigmatism function and a propagating direction changing function in the similar manner as the inventive example.

Concerning the astigmatism function, the areas A through F are designed in such a manner that a light flux is converged in a direction (a flat surface direction) parallel to one of two boundaries defined by each one of the areas A through F, and the other two areas adjacent to the one area around the optical axis of laser light to form a focal line at the focal line position (S2) shown in FIG. 1A; and that a light flux is converged in a direction perpendicular to the one boundary to form a focal line at the focal line position (S1) different from the focal line position (S2).

Concerning the propagating direction changing function, the areas A through F are designed in such a manner that the propagating directions of laser light to be entered into the areas A through F are respectively changed into directions Da through Df shown in FIG. 11A. The directions Da and Db are respectively aligned with the Z-axis positive direction and the Z-axis negative direction, and the directions Db, Dc, De, and Df are each aligned with a direction inclined with respect to Y-axis by 67.5 degrees, and inclined with respect to Z-axis by 22.5 degrees.

The astigmatism function and the propagating direction changing function are adjusted in such a manner that laser light (signal light, and stray light 1 and 2) passing the areas A through F is distributed as shown in FIG. 11B on the light receiving surface of the photodetector 112 shown in FIG. 7 in a state that the laser light is focused on a targeted recording layer. Accordingly, similarly to the inventive example, it is possible to define a signal light area where only signal light exists, and only signal light can be received by the respective corresponding sensing portions by arranging the sensing portions at a position corresponding to the signal light area.

Figure 12B:
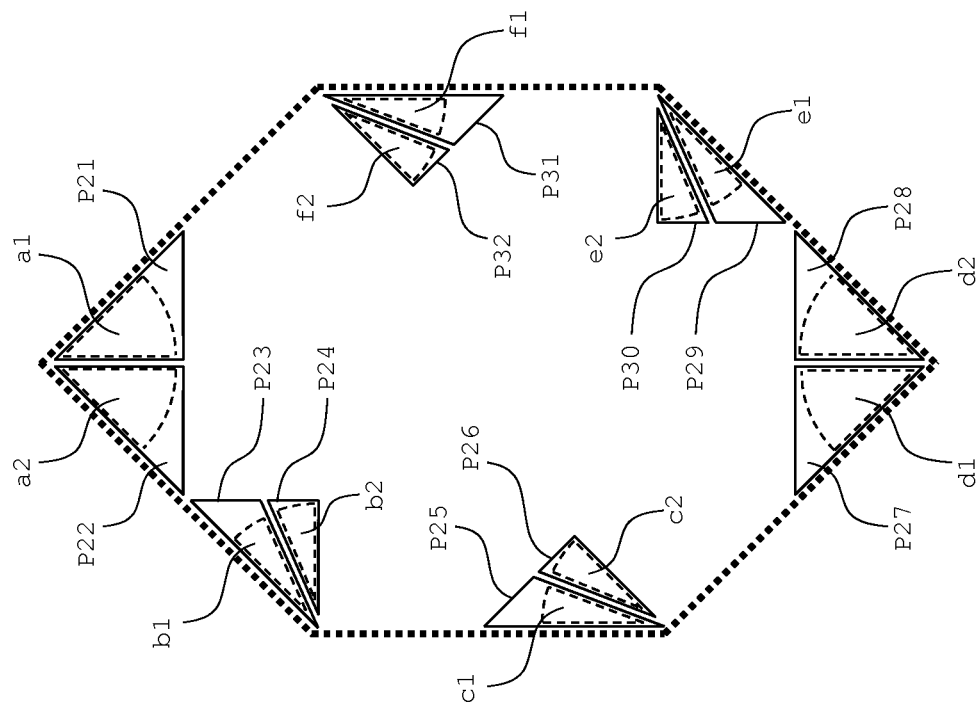
FIGS. 12A and 12B are diagrams for describing a method for arranging sensing portions in modification example 1.
Figure 12A:
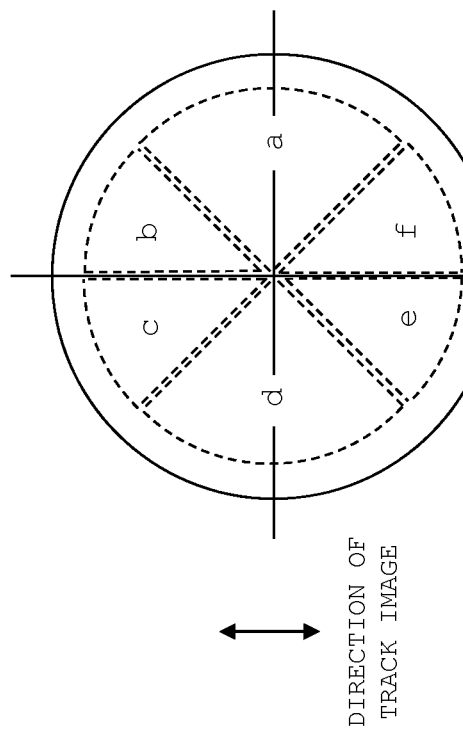

FIGS. 12A and 12B are diagrams for describing a method for arranging the sensing portions in modification example 1. FIG. 12A is a diagram showing light flux areas "a" through "f" corresponding to reflection light (signal light) from a disc, which are entered into the areas A through F of the anamorphic lens shown in FIG. 11A. FIG. 12B is a diagram showing the sensing portions based on modification example 1.

Referring to FIG. 12B, each of light fluxes (signal light) in the light flux areas "a" through "f" is received by two corresponding sensing portions. In FIG. 12B, symbols a1 and a2, b1 and b2, c1 and c2, d1 and d2, e1 and e2, and f1 and f2 respectively denote light fluxes obtained by dividing the light fluxes in the light flux areas "a" through "f" into two. As shown in FIG. 12B, the light fluxes a1 through f2 are respectively received by corresponding sensing portions P21 through P32. Specifically, the sensing portions P21 and P22, the sensing portions P23 and P24, the sensing portions P25 and P26, the sensing portions P27 and P28, the sensing portions P29 and P30, and the sensing portions P31 and P32 are set at such positions that a half of the respective light fluxes in the light flux areas "a" through "f" is received at a time when signal light is focused on a targeted recording layer.

In modification example 1, assuming that detection signals based on the light receiving amounts of the sensing portions P21 through P32 are respectively A1, A2, B1, B2, C1, C2, D1, D2, E1, E2, F1, and F2, a push-pull signal PP is obtained by performing the following computation:

$$PP=(A1+A2+B1+B2+F1+F2)-(D1+D2+C1+C2+E1+E2)$$

FIGS. 13A through 13C are diagrams showing detection signals and a focus error signal from each of the sensing portions. In FIGS. 13A through 13C, the axis of ordinate denotes a detection signal from a sensing portion, or a computation result, and the axis of abscissas denotes a distance between an objective lens and a disc. The original point of the axis of abscissas denotes a position of the objective lens where signal light is focused on a targeted recording layer (hereinafter, called as a "focus position").

Referring to FIG. 13A, a symbol s1 denotes the detection signals A1 and D1, and a symbol s2 denotes the detection signals A2 and D2. In this case, a symbol s3 representing (s1-s2) becomes zero at a focus position, as shown in FIG. 13A.

Referring to FIG. 13B, a symbol s4 denotes the detection signal B1, C1, E1, F1, and a symbol s5 denotes the detection signal B2, C2, E2, F2. In this case, a symbol s6 representing (s4-s5) becomes zero at a focus position, as shown in FIG. 13B.

Accordingly, the focus error signal FE can be expressed by using A1 through F2 as follows:

$$FE=\{(A1-A2)+(D1-D2)+\{(B1-B2)+(C1-C2)+(E1-E2)+(F1-F2)\}$$

FIG. 13C is a diagram showing the focus error signal FE. As shown in FIG. 13C, the focus error signal has an S-shaped curve, and becomes zero at a focus position. Accordingly, the focus position of signal light can be adjusted on a targeted recording layer by driving the objective lens in a direction perpendicular to the optical axis to such a position that the focus error signal FE becomes zero.

As described above, similarly to the inventive example, in modification example 1, a signal light area can be defined by the anamorphic lens shown in FIG. 11A, and a high-quality detection signal, with an influence by stray light being suppressed, can be obtained by arranging the photodetector having the sensing portions as shown in FIG. 12B at a position corresponding to the signal light area.

Modification Example 2

In modification example 2, it is possible to prevent signal light, and stray light 1 and 2 from being superimposed one over the other by using an anamorphic lens different from the anamorphic lens shown in FIG. 11A.

FIG. 14A is a diagram showing an arrangement of an anamorphic lens in modification example 2. The anamorphic lens in modification example 2 is divided into eight areas around an optical axis. Each of the areas has an angle of 45 degrees in the circumferential direction of the optical axis, and has an astigmatism function and a propagating direction changing function in the similar manner as the inventive example.

Concerning the astigmatism function, the areas A through H are designed in such a manner that a light flux is converged in a direction (a flat surface direction) parallel to one of two boundaries defined by each one of the areas A through H, and the other two areas adjacent to the one area around the optical axis of laser light to form a focal line at the focal line position (S2) shown in FIG. 1A; and that a light flux is converged in a direction perpendicular to the one boundary to forma focal line at the focal line position (S1) different from the focal line position (S2).

Concerning the propagating direction changing function, the areas A through H are designed in such a manner that the propagating directions of laser light to be entered into the areas A through H are respectively changed into directions Da through Dh shown in FIG. 14A. The directions Da through Dh are inclined with respect to the flat surface directions of the respective areas by 67.5 degrees.

Figure 14B:
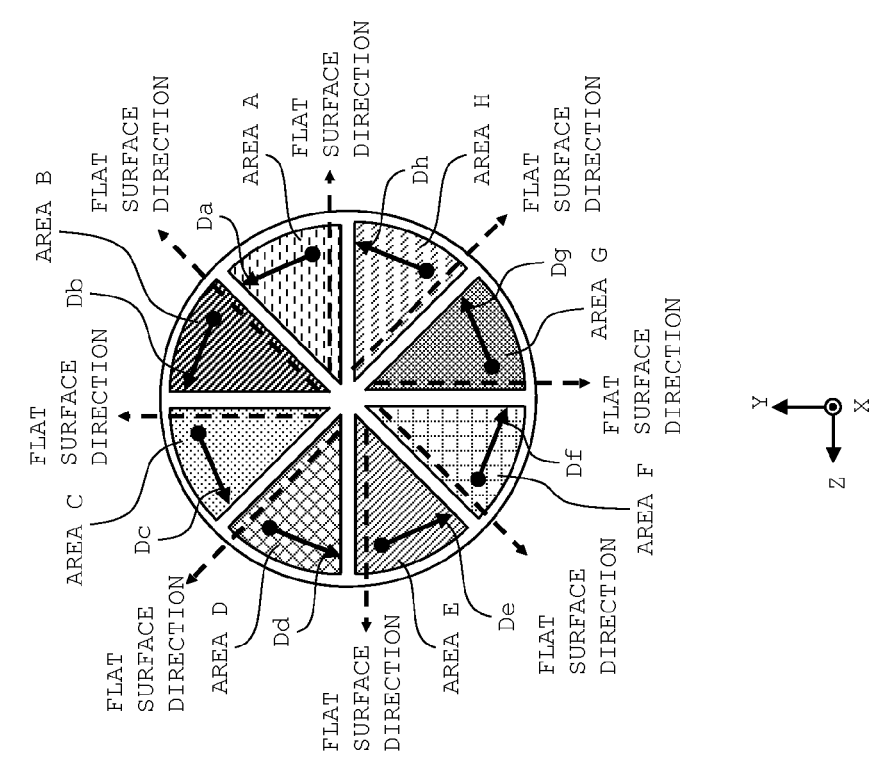

The astigmatism function and the propagating direction changing function are adjusted in such a manner that laser light (signal light, and stray light 1 and 2) passing the areas A through H is distributed as shown in FIG. 14B on the light receiving surface of the photodetector 112 shown in FIG. 7 in a state that the laser light is focused on a targeted recording layer. Accordingly, similarly to the inventive example, it is possible to define a signal light area where only signal light exists, and only signal light can be received by the respective corresponding sensing portions by arranging the sensing portions at a position corresponding to the signal light area.

FIGS. 15A and 15B are diagrams for describing a method for arranging the sensing portions in modification example 2. FIG. 15A is a diagram showing light flux areas "a" through "h" corresponding to reflection light (signal light) from a disc, which are entered into the areas A through H of the anamorphic lens shown in FIG. 14A. FIG. 15B is a diagram showing the sensing portions based on modification example 2.

Referring to FIG. 15B, each of light fluxes (signal light) of the light flux areas "a" through "h" is received by two corresponding sensing portions. In FIG. 15B, the symbols a1 and a2, b1 and b2, c1 and c2, d1 and d2, e1 and e2, f1 and f2, g1 and g2, and h1 and h2 respectively denote light fluxes obtained by dividing the light fluxes in the light flux areas "a" through "h" into two. As shown in FIG. 15B, the light fluxes a1 through h2 are respectively received by corresponding sensing portions P41 through P56. Specifically, the sensing portions P41 and P42, the sensing portions P43 and P44, the sensing portions P45 and P46, the sensing portions P47 and P48, the sensing portions P49 and P50, the sensing portions P51 and P52, the sensing portions P53 and P54, and the sensing portions P55 and P56 are designed in such a manner that a half of the respective light fluxes in the light flux areas "a" through "h" is received at a time when signal light is focused on a targeted recording layer.

In modification example 2, assuming that detection signals based on the light receiving amounts of the sensing portions P41 through P56 are respectively A1, A2, B1, B2, C1, C2, D1, D2, E1, E2, F1, F2, G1, G2, H1, and H2, a push-pull signal PP is obtained by performing the following computation:

$$PP=(A1+A2+B1+B2+G1+G2+H1+H2)-(D1+D2+E1+E2+C1+C2+F1+F2)$$

Figure 16B:
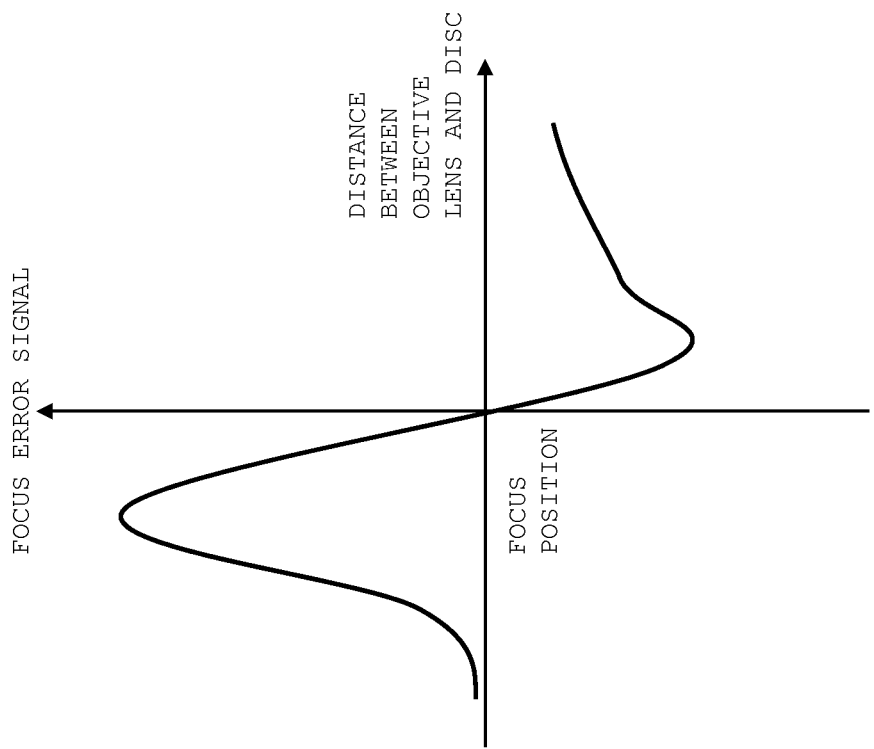
FIGS. 16A and 16B are diagrams for describing a focus error signal in modification example 2.
Figure 16A:
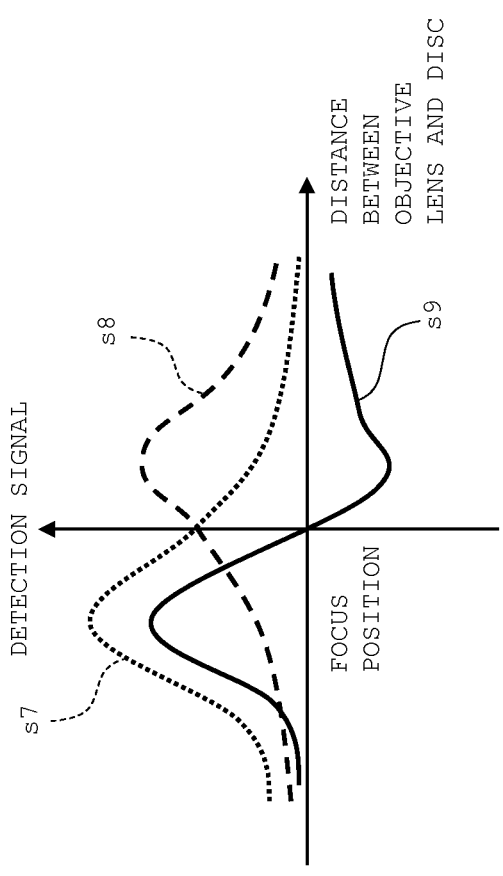

FIGS. 16A and 16B are diagrams showing a detection signal from each of the sensing portions, and a focus error signal.

Referring to FIG. 16A, a symbol s7 denotes the detection signal A1, B1, C1, D1, E1, F1, G1, H1, and a symbol s8 denotes the detection signal A2, B2, C2, D2, E2, F2, G2, H2. In this case, a symbol s9 representing (s7-s8) becomes zero at a focus position, as shown in FIG. 16A.

Accordingly, the focus error signal FE can be expressed by using A1 through H2 as follows:

$$FE=(A1-A2)+(B1-B2)+(C1-C2)+(D1-D2)+(E1-E2)+(F1-F2)+(G1-G2)+(H1-H2)$$

FIG. 16B is a diagram showing the focus error signal FE. As shown in FIG. 16B, the focus error signal has an S-shaped curve, and becomes zero at a focus position. Accordingly, the focus position of signal light can be arranged on a targeted recording layer by driving the objective lens to such a position that the focus error signal FE becomes zero.

As described above, similarly to the inventive example, in modification example 2, a signal light area can be defined by the anamorphic lens shown in FIG. 14A, and a high-quality detection signal, with an influence by stray light being suppressed, can be obtained by arranging the photodetector having the sensing portions as shown in FIG. 15B at a position corresponding to the signal light area.

Other Modifications

In the foregoing description, the inventive example, and modification examples 1 and 2 are described. The invention is not limited to the foregoing examples, and the embodiment of the invention may be modified in various ways other than the above.

For instance, in the inventive example, the anamorphic lens 111 is provided with both of the astigmatism function shown in FIG. 1A and the propagating direction changing function shown in FIG. 5A. Alternatively, the anamorphic lens 111 may be provided with only the astigmatism function, and another optical element may be provided with the propagating direction changing function. Further alternatively, a hologram element may be provided with both of the functions. In the latter modification, the hologram element may be used, in place of the anamorphic lens 111. A hologram pattern of the hologram element may be designed by a well-known technique.

FIGS. 17A through 17C are diagrams showing a direction changing element 120 for imparting a propagating direction changing function. FIG. 17A shows an arrangement example wherein the direction changing element 120 is constituted of a hologram element having a diffraction pattern. FIGS. 17B and 17C show an arrangement example, wherein the direction changing element 120 is constituted of a multifaceted prism.

In the arrangement example shown in FIG. 17A, the direction changing element 120 is formed of a transparent plate of a square shape, and a hologram pattern is formed on a light incident surface of the direction changing element 120. As shown in FIG. 17A, the light incident surface is divided into four hologram areas 120a through 120d. Further, similarly to FIG. 5A, the hologram areas 120a through 120d are operable to diffract incident laser light (signal light, and stray light 1 and 2) in directions Va through Vd, respectively. With the above arrangement, substantially the same effect as the anamorphic lens 111 in the inventive example can be obtained by the anamorphic lens and the direction changing element 120. The hologram to be formed on the hologram areas 120a through 120d may have a stepped pattern or a blazed pattern.

Further alternatively, the arrangement shown in FIG. 17B may be used in place of the arrangement shown in FIG. 17A. In the modification shown in FIG. 17B, the direction changing element 120 is formed of a transparent member provided with a flat light exit surface, and a light incident surface having four areas which are inclined in different directions from each other.

FIG. 17C is a diagram of the direction changing element 120 shown in FIG. 17B, when viewed from the light incident surface side. As shown in FIG. 17C, four slopes 120e through 120h are formed on the light incident surface of the direction changing element 120. Upon incidence of a light ray parallel to X-axis from the incident surface side into the slopes 120e through 120e, the propagating directions of light are respectively changed into directions Va through Vd shown in FIG. 17C by refraction of light at the time of incidence into the slopes 120e through 120h. In the modification, substantially the same effect as the effect to be obtained by the anamorphic lens 111 in the inventive example can be obtained by the anamorphic lens and the direction changing element 120.

In the case where the focal line positions generated by an astigmatism function have the positional relation as shown in FIG. 1A, the direction changing element 120 is disposed at a position closer to the disc than the focal line position (M11) of stray light 1 in the curved surface direction. In this arrangement, the distribution state of stray light 1 and 2 on the plane S0 (the light receiving surface of the photodetector 112) becomes the state as shown in FIGS. 9A and 9B, as described in the description on the principle and the inventive example.

Further alternatively, the direction changing element 120 may be disposed between the focal line position (M12) and the focal line position (S1) shown in FIG. 1A. In the modification, similarly to the above, the distribution state of stray light 2 on the plane S0 (the light receiving surface of the photodetector 112) becomes the state as shown in FIG. 9B, and likewise, the distribution state of stray light 1 also becomes the state as shown in FIG. 9B. Since the direction changing element is arranged at a position closer to the photodetector, it is possible to integrally form the direction changing element and the photodetector.

In modification examples 1 and 2, it is possible to provide the anamorphic lens 111 only with the astigmatism function, and provide another optical element with the propagating direction changing function. In the modification, similarly to the arrangements shown in FIGS. 17A through 17C, an optical element for imparting the propagating direction changing function may be constituted of a hologram element or a light refraction element.

In the inventive example, and modification examples 1 and 2, it is possible to use a polarization converting element which converts polarization directions of light in adjacent light flux areas in directions orthogonal to each other. In the modification, the polarization converting element is disposed at a position closer to the disc than the optical element having a propagating direction changing element. Specifically, the polarization converting element is disposed at a position closer to the disc than the anamorphic lens 111 in the inventive example, and the direction changing element 120 in the other modification.

In the above modification, the polarization directions are aligned in directions orthogonal to each other even on a portion where the light flux areas of stray light 1 and 2 are superimposed one over the other on the photodetector. Accordingly, coherence of stray light on the superimposed portion can be suppressed. Therefore, amplification of a stray light component resulting from coherence of stray light can be suppressed, which enables to suppress leakage of stray light into a sensing portion.

The embodiment of the invention may be changed or modified in various ways as necessary, as far as such changes and modifications do not depart from the scope of the claims of the invention hereinafter defined.

What is claimed is:

1. An optical pickup device for irradiating laser light onto a recording medium having a plurality of recording layers, comprising:
   a light source for emitting laser light;
   an objective lens for converging the laser light on the recording medium;
   an astigmatism portion for receiving the laser light reflected on the recording medium, and provided with four or more lens areas formed around an optical axis of the laser light to impart astigmatism to the laser light individually with respect to each of the lens areas;
   a light flux separating portion for making propagating directions of a light flux of the laser light to be entered into each of the lens areas different from each other to separate the light fluxes from each other; and
   a photodetector for receiving the separated light fluxes to output a detection signal, wherein
   the lens areas are configured in such a manner that the light flux in each one of the lens areas is converged in a direction parallel to a first boundary out of the first boundary and a second boundary defined between the one lens area, and the other two lens areas adjacent to the one lens area around the optical axis to form a focal line at a position of a first focal length, and that the light flux is converged in a direction perpendicular to the first boundary to form a focal line at a position of a second focal length different from the first focal length, and
   the first boundaries of the respective lens areas are defined at such positions that the first boundaries are perpendicular to each other.

2. The optical pickup device according to claim 1, wherein the light flux separating portion causes propagating directions of the light flux of the laser light to be entered into each of the lens areas different from each other in such a manner that each of the separated light fluxes is guided to different vertex positions of a polygon, on a light receiving surface of the photodetector.

3. The optical pickup device according to claim 1, wherein the astigmatism portion and the light flux separating portion are integrally formed into an optical element.

4. The optical pickup device according to claim 1, wherein an angle of each of the lens areas around the optical axis is set to 90 degrees or less.

5. The optical pickup device according to claim 1, wherein the astigmatism portion has four lens areas,
   the angle of each of the lens areas around the optical axis is set to 90 degrees, and
   the light flux separating portion is configured in such a manner that, in the case where the laser light is focused on a targeted recording layer of the recording medium, each of the light fluxes of the laser light reflected on the targeted recording layer is positioned at a position corresponding to a vertex of a square on a light receiving surface of the photodetector.

6. An optical disc device, comprising:
   an optical pickup device; and
   a computing circuit,
   the optical pickup device including
      a light source for emitting laser light;
      an objective lens for converging the laser light on the recording medium;
      an astigmatism portion for receiving the laser light reflected on the recording medium, and which is provided with four or more lens areas formed around an optical axis of the laser light to impart astigmatism to the laser light individually with respect to each of the lens areas;
   a light flux separating portion for making propagating directions of a light flux of the laser light to be entered into each of the lens areas different from each other to separate the light fluxes from each other; and
   a photodetector for receiving the separated light fluxes to output a detection signal, wherein
      the computing circuit processes an output from the photodetector, wherein
   the lens areas are configured in such a manner that the light flux in each one of the lens areas is converged in a direction parallel to a first boundary out of the first boundary and a second boundary defined between the one lens area, and the other two lens areas adjacent to the one lens area around the optical axis to form a focal line at a position of a first focal length, and that the light flux is converged in a direction perpendicular to the first boundary to form a focal line at a position of a second focal length different from the first focal length, and
   the first boundaries of the respective lens areas are defined at such positions that the first boundaries are perpendicular to each other.

7. The optical disc device according to claim 6, wherein the light flux separating portion causes propagating directions of the light flux of the laser light to be entered into each of the lens areas different from each other in such a manner that each of the separated light fluxes is guided to different vertex positions of a polygon, on a light receiving surface of the photodetector.

8. The optical disc device according to claim 6, wherein the astigmatism portion and the light flux separating portion are integrally formed into an optical element.

9. The optical disc device according to claim 6, wherein an angle of each of the lens areas around the optical axis is set to 90 degrees or less.

10. The optical disc device according to claim 6, wherein the astigmatism portion has four lens areas, the angle of each of the lens areas around the optical axis is set to 90 degrees, and the light flux separating portion is configured in such a manner that, in the case where the laser light is focused on a targeted recording layer of the recording medium, each of the light fluxes of the laser light reflected on the targeted recording layer is positioned at a position corresponding to a vertex of a square on a light receiving surface of the photodetector.

* * * * *